(12) United States Patent
Marcil et al.

(10) Patent No.: US 9,277,687 B2
(45) Date of Patent: Mar. 8, 2016

(54) TILLER HOUSING

(71) Applicant: Black & Decker Inc., Newark, DE (US)

(72) Inventors: Patrick Marcil, Ottawa (CA); Mark Slobodian, Ottawa (CA)

(73) Assignee: BLACK & DECKER INC., New Britain, CT (US)

( * ) Notice: Subject to any disclaimer, the term of this patent is extended or adjusted under 35 U.S.C. 154(b) by 0 days.

(21) Appl. No.: 14/153,298

(22) Filed: Jan. 13, 2014

(65) Prior Publication Data

US 2014/0158384 A1  Jun. 12, 2014

Related U.S. Application Data

(60) Division of application No. 13/214,781, filed on Aug. 22, 2011, now Pat. No. 8,627,897, which is a continuation-in-part of application No. 12/540,939, filed on Aug. 13, 2009, now Pat. No. 7,963,344.

(60) Provisional application No. 61/093,918, filed on Sep. 3, 2008.

(51) Int. Cl.
*A01B 33/02* (2006.01)
*A01B 33/08* (2006.01)

(52) U.S. Cl.
CPC ............ *A01B 33/082* (2013.01); *A01B 33/028* (2013.01)

(58) Field of Classification Search
USPC ............. 172/42, 43, 256, 259, 260, 329, 351, 172/354, 358, 359, 362, 364, 525
See application file for complete search history.

(56) References Cited

U.S. PATENT DOCUMENTS

| | | | |
|---|---|---|---|
| 913,953 A | 3/1909 | Granger | |
| 1,354,495 A | 10/1920 | Larsen | |
| 1,512,502 A * | 10/1924 | Schilling | ................ 172/350 |
| 1,568,136 A | 1/1926 | Crump | |
| 1,579,297 A | 4/1926 | Franklin | |
| 2,539,181 A | 1/1951 | Brown | |
| 2,781,711 A | 2/1957 | Williams | |

(Continued)

FOREIGN PATENT DOCUMENTS

| | | |
|---|---|---|
| DE | 86 25 564 | 12/1986 |
| EP | 0771520 A1 | 5/1997 |

(Continued)

OTHER PUBLICATIONS

Non-Final Office Action regarding U.S. Appl. No. 13/214,781, mailed Feb. 5, 2013.

*Primary Examiner* — Matthew D Troutman
(74) *Attorney, Agent, or Firm* — Harness, Dickey & Pierce, P.L.C.

(57) ABSTRACT

A tiller includes a tiller frame and an upright assembly extending from the frame. The frame is supported by at least one wheel and defines a cavity. A transmission assembly is supported by the frame and has an output member that is configured to be drivingly coupled to a first power source in a first battery-powered configuration and to a second power source in a second electric-powered configuration. A tilling implement includes a drive shaft that is driven by the output member. The tilling implement comprises at least one tine plate. The cavity is configured to removably receive a battery in the first battery-powered configuration and removably receive a ballast in the second electric-powered configuration.

21 Claims, 30 Drawing Sheets

(56) References Cited

U.S. PATENT DOCUMENTS

| | | |
|---|---|---|
| 2,803,183 A | 8/1957 | Smithburn |
| 2,847,924 A | 8/1958 | Quick |
| 2,888,994 A | 6/1959 | Hoff et al. |
| 2,903,077 A | 9/1959 | Kamlukin |
| 2,915,318 A | 12/1959 | Chesser |
| 2,975,843 A | 3/1961 | Lattin |
| 3,031,898 A | 5/1962 | Eaton |
| 3,180,428 A | 4/1965 | Price |
| 3,204,704 A | 9/1965 | Goette |
| 3,376,798 A | 4/1968 | Bodine |
| 3,444,940 A | 5/1969 | Thomas et al. |
| 3,452,823 A | 7/1969 | Shapland, Jr. |
| 3,504,748 A | 4/1970 | Croft |
| 3,550,714 A | 12/1970 | Bellinger |
| 3,559,743 A | 2/1971 | Hastings |
| 3,647,005 A | 3/1972 | Boyd |
| 3,658,135 A | 4/1972 | Thompson |
| 3,710,870 A | 1/1973 | Pfeiffer |
| 3,747,687 A | 7/1973 | Bodine |
| 3,760,884 A | 9/1973 | Webster et al. |
| 3,792,734 A | 2/1974 | Ellis et al. |
| 3,901,325 A | 8/1975 | Richards |
| 3,935,905 A | 2/1976 | Chery |
| 3,986,573 A | 10/1976 | Alderson et al. |
| 4,002,205 A | 1/1977 | Falk |
| 4,034,687 A | 7/1977 | van der Lely |
| 4,044,841 A | 8/1977 | Smith et al. |
| 4,062,408 A | 12/1977 | Enters et al. |
| 4,074,764 A | 2/1978 | Enters |
| 4,102,407 A | 7/1978 | Danszky et al. |
| 4,133,390 A | 1/1979 | Reaume |
| 4,136,983 A | 1/1979 | Dobberpuhl |
| 4,139,064 A | 2/1979 | Dobberpuhl |
| 4,164,983 A | 8/1979 | Hoch |
| 4,165,786 A | 8/1979 | Dobberpuhl |
| 4,191,259 A | 3/1980 | Boren |
| 4,196,678 A * | 4/1980 | Lore et al. ............ 111/132 |
| 4,213,504 A | 7/1980 | Schneider |
| 4,214,538 A | 7/1980 | Druskin et al. |
| 4,214,632 A | 7/1980 | Brookshier |
| 4,224,996 A | 9/1980 | Dobberpuhl |
| 4,237,983 A | 12/1980 | Allen |
| 4,276,940 A | 7/1981 | Kirkegaard |
| 4,286,670 A | 9/1981 | Ackerman |
| 4,286,671 A | 9/1981 | Mays |
| 4,305,470 A | 12/1981 | Anderson |
| 4,336,760 A * | 6/1982 | Cohen et al. ............ 111/131 |
| 4,351,396 A | 9/1982 | Moulton |
| 4,354,564 A | 10/1982 | Watanabe et al. |
| 4,386,661 A | 6/1983 | McCanse et al. |
| 4,421,176 A | 12/1983 | Tuggle et al. |
| 4,452,316 A | 6/1984 | Edwards |
| 4,456,075 A | 6/1984 | Hostetter |
| 4,483,400 A | 11/1984 | Arndt |
| 4,501,332 A | 2/1985 | Straayer |
| 4,509,438 A | 4/1985 | Rau et al. |
| 4,518,047 A | 5/1985 | Peterson et al. |
| 4,524,635 A | 6/1985 | Hulin et al. |
| 4,541,492 A | 9/1985 | Motruk |
| 4,567,949 A | 2/1986 | Herscher |
| 4,591,001 A | 5/1986 | Barbee |
| 4,640,366 A | 2/1987 | Saito |
| 4,648,464 A | 3/1987 | Huxley |
| 4,667,745 A * | 5/1987 | Hasler ............ 172/42 |
| 4,699,219 A | 10/1987 | Durrant et al. |
| 4,753,062 A | 6/1988 | Roelle |
| 4,760,758 A | 8/1988 | Murayama |
| 4,776,405 A | 10/1988 | Grieder et al. |
| 4,811,794 A | 3/1989 | Greene |
| 4,834,189 A | 5/1989 | Peterson et al. |
| 4,835,952 A | 6/1989 | McLane |
| 4,911,247 A | 3/1990 | Kuhlmann et al. |
| RE33,238 E | 6/1990 | Moulton et al. |
| 4,950,013 A | 8/1990 | Yonkers |
| 4,986,368 A | 1/1991 | Underwood et al. |
| 5,014,791 A * | 5/1991 | Kure ............ 172/21 |
| 5,020,602 A * | 6/1991 | Dellinger ............ 172/21 |
| 5,048,616 A | 9/1991 | Hoff |
| 5,048,617 A | 9/1991 | Haven |
| 5,085,043 A | 2/1992 | Hess et al. |
| 5,097,909 A | 3/1992 | Jauhal et al. |
| 5,107,551 A | 4/1992 | Weir et al. |
| 5,133,269 A | 7/1992 | Charneski |
| 5,156,217 A | 10/1992 | Hirata et al. |
| 5,163,273 A | 11/1992 | Wojtkowski et al. |
| 5,197,551 A | 3/1993 | Farley |
| 5,213,170 A | 5/1993 | Savitski |
| 5,230,208 A | 7/1993 | Hess et al. |
| 5,338,078 A | 8/1994 | Basek |
| 5,353,881 A | 10/1994 | Lee et al. |
| 5,398,767 A * | 3/1995 | Warke ............ 172/21 |
| 5,490,370 A | 2/1996 | McNair et al. |
| 5,491,963 A | 2/1996 | Jerez |
| 5,520,253 A | 5/1996 | Kesting |
| 5,562,166 A | 10/1996 | Griffin |
| 5,564,353 A | 10/1996 | Wade et al. |
| 5,566,581 A | 10/1996 | Smale et al. |
| 5,573,069 A | 11/1996 | Shipley |
| 5,619,845 A * | 4/1997 | Bruener et al. ............ 320/137 |
| 5,651,418 A | 7/1997 | Jerez |
| 5,695,011 A | 12/1997 | Daniels |
| 5,713,420 A | 2/1998 | Roberts et al. |
| 5,730,225 A | 3/1998 | Fults |
| 5,740,869 A | 4/1998 | Sandholzer |
| 5,810,093 A | 9/1998 | Howard |
| 5,819,513 A | 10/1998 | Braun et al. |
| 5,850,882 A | 12/1998 | Link |
| 5,896,931 A | 4/1999 | Roberts et al. |
| 5,937,622 A | 8/1999 | Carrier et al. |
| 5,960,889 A | 10/1999 | McLaren |
| 6,027,153 A | 2/2000 | Marshall |
| 6,082,214 A | 7/2000 | Paparoni |
| 6,092,435 A | 7/2000 | Paparoni |
| 6,092,608 A | 7/2000 | Leger |
| 6,119,787 A | 9/2000 | Garcia |
| 6,155,033 A | 12/2000 | Wians et al. |
| 6,227,317 B1 | 5/2001 | Severns |
| 6,247,539 B1 | 6/2001 | Jerez |
| 6,260,631 B1 | 7/2001 | Torrez |
| 6,273,197 B1 * | 8/2001 | Marlow ............ 172/21 |
| 6,352,122 B1 | 3/2002 | Love |
| 6,404,078 B1 | 6/2002 | Thomas et al. |
| 6,452,823 B1 | 9/2002 | Naji |
| 6,470,766 B2 | 10/2002 | Ohta et al. |
| 6,488,101 B1 | 12/2002 | Miyahara et al. |
| 6,502,649 B1 | 1/2003 | Havel |
| 6,540,031 B1 | 4/2003 | Sasaoka |
| 6,606,845 B1 | 8/2003 | Spies |
| 6,615,928 B2 | 9/2003 | Dueitt |
| 6,631,770 B2 | 10/2003 | Guard et al. |
| 6,634,435 B2 | 10/2003 | Saeger |
| 6,648,113 B1 | 11/2003 | Bellfy |
| 6,651,752 B2 | 11/2003 | Sasaoka |
| 6,662,406 B2 | 12/2003 | Shonfeld et al. |
| 6,675,918 B2 | 1/2004 | Chou |
| 6,681,871 B2 | 1/2004 | Drumm et al. |
| 6,684,960 B1 * | 2/2004 | Ng et al. ............ 172/22 |
| 6,708,773 B1 * | 3/2004 | Kinkead et al. ............ 172/21 |
| 6,708,774 B2 | 3/2004 | Miyahara et al. |
| 6,722,444 B2 | 4/2004 | McKill |
| 6,722,445 B2 | 4/2004 | Ohta et al. |
| 6,729,116 B1 | 5/2004 | Graus et al. |
| 6,766,601 B2 | 7/2004 | Dickins |
| 6,779,611 B2 | 8/2004 | Sugimoto et al. |
| 6,823,947 B2 | 11/2004 | Nagaoka et al. |
| 6,843,324 B2 | 1/2005 | Basek |
| 6,883,616 B2 | 4/2005 | Templeton |
| 6,904,976 B1 | 6/2005 | Zach et al. |
| 6,904,977 B2 | 6/2005 | Zerrer et al. |
| 6,913,557 B2 | 7/2005 | Ohkubo et al. |
| 6,920,939 B2 | 7/2005 | Sasaoka et al. |
| 6,945,333 B1 | 9/2005 | Drost et al. |
| 6,955,227 B1 | 10/2005 | Motosko |
| 6,962,209 B2 | 11/2005 | Isaman et al. |

(56) References Cited

U.S. PATENT DOCUMENTS

| | | |
|---|---|---|
| 6,968,906 B2 | 11/2005 | Ito et al. |
| D518,491 S | 4/2006 | Vaughn |
| 7,040,448 B2 | 5/2006 | Good |
| D523,026 S | 6/2006 | Vaughn |
| 7,096,970 B1 | 8/2006 | Porter et al. |
| 7,148,438 B2 | 12/2006 | Magrini |
| 7,237,620 B2 | 7/2007 | Abenroth et al. |
| 7,392,854 B2 | 7/2008 | Ikeda et al. |
| 7,562,602 B2 | 7/2009 | Blascok et al. |
| 7,741,793 B2 * | 6/2010 | Lucas et al. .............. 318/139 |
| 8,069,639 B2 | 12/2011 | Fancher, III |
| 8,286,721 B2 * | 10/2012 | Gerbaud et al. .............. 172/42 |
| 8,291,991 B1 * | 10/2012 | Cook .............................. 172/21 |
| 8,653,786 B2 * | 2/2014 | Baetica et al. .............. 320/104 |
| 2003/0079455 A1 | 5/2003 | Suchdev et al. |
| 2003/0159840 A1 | 8/2003 | Schmidt |
| 2003/0178208 A1 | 9/2003 | Abenroth et al. |
| 2005/0045347 A1 | 3/2005 | Stark et al. |
| 2005/0133230 A1 | 6/2005 | Sheehan et al. |
| 2005/0241838 A1 | 11/2005 | Hurt |
| 2005/0241839 A1 | 11/2005 | Demar et al. |
| 2006/0059880 A1 | 3/2006 | Angott |
| 2006/0096267 A1 | 5/2006 | Tarver |
| 2007/0163789 A1 | 7/2007 | Thackery |
| 2008/0163520 A1 | 7/2008 | White et al. |
| 2009/0065221 A1 | 3/2009 | Vaughn et al. |
| 2009/0266042 A1 * | 10/2009 | Mooney et al. .............. 56/11.9 |
| 2010/0065291 A1 | 3/2010 | Gerbaud et al. |
| 2010/0139936 A1 | 6/2010 | Notaras et al. |
| 2011/0083865 A1 | 4/2011 | Sedmak |
| 2011/0209886 A1 | 9/2011 | Gendelman et al. |

FOREIGN PATENT DOCUMENTS

| | | |
|---|---|---|
| EP | 1125485 A1 | 8/2001 |
| EP | 1698221 A1 | 9/2006 |
| EP | 2033507 A1 | 3/2009 |
| EP | 2160937 A1 | 3/2010 |
| EP | 2250865 A1 | 11/2010 |
| FR | 1 196 512 A | 11/1959 |
| FR | 2018798 A1 | 6/1970 |
| FR | 2 845 959 A1 | 4/2004 |
| GB | 2122303 A | 1/1984 |
| GB | 2142512 A | 1/1985 |
| JP | 10-271901 A | 10/1998 |
| JP | 2003204704 A | 7/2003 |
| WO | WO-9614218 A2 | 5/1996 |
| WO | WO-9705761 A1 | 2/1997 |

* cited by examiner

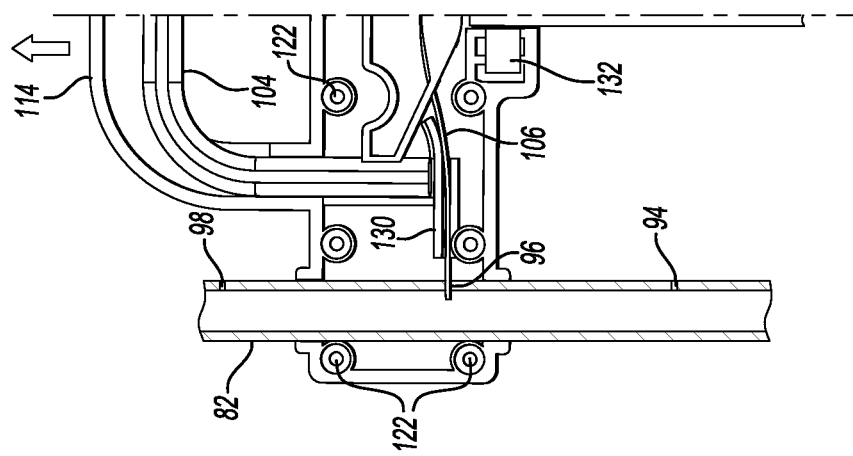
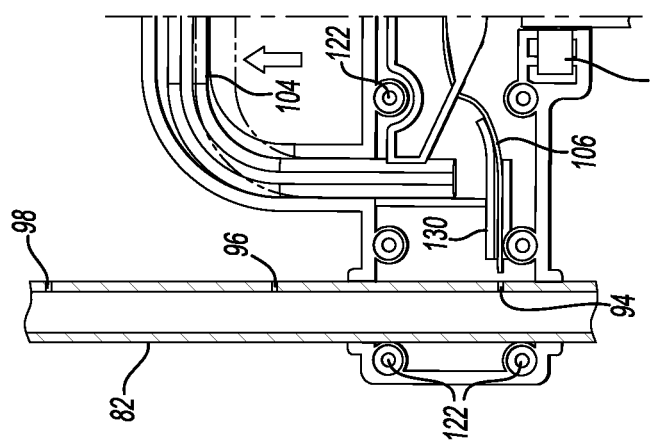
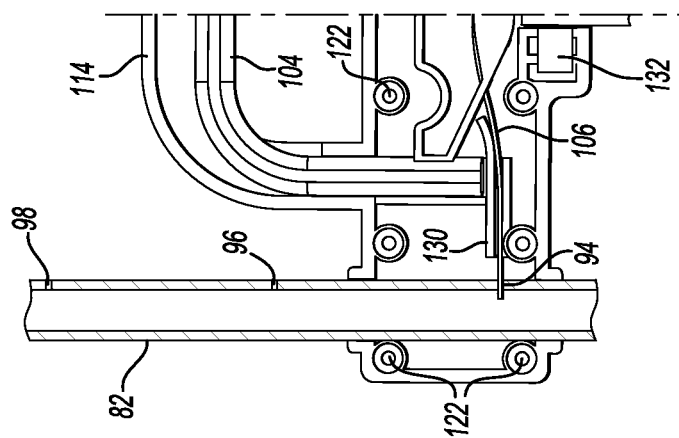

TILLER HOUSING

CROSS-REFERENCE TO RELATED APPLICATIONS

This application is a division of U.S. patent application Ser. No. 13/214,781, filed Aug. 22, 2011, which is a continuation-in-part of U.S. patent application Ser. No. 12/540,939, filed Aug. 13, 2009 (now U.S. Pat. No. 7,963,344, issued Jun. 21, 2011), which claims the benefit of U.S. Provisional Application No. 61/093,918, filed on Sep. 3, 2008. The entire disclosure of each of the above referenced applications is incorporated by reference as if fully set forth in detail herein.

FIELD

The present disclosure relates to tillers and more specifically to a tiller configured for use in either a battery-powered configuration or an electric-powered configuration.

BACKGROUND

Due to concerns regarding urban air pollution, as well as other factors, electric outdoor power equipment has been gaining in popularity. Moreover, due to the inconveniences and operating limitations of corded electric outdoor power equipment, battery operated equipment may be preferred. However, such electric and/or battery operated tillers can have drawbacks.

By way of example, some of these drawbacks can be associated with the functionality of the battery. Such drawbacks can include insufficient battery life, and inconvenient battery manipulation (i.e., such as during installation and removal of the battery from the tiller). Electric-powered tillers may not have enough mass to urge the tilling implement into the ground. In other examples, an output of a battery-powered or electric-powered motor may have an undesirably elevated revolutions per minute (RPM) to effectively convert into rotations of a tilling implement.

SUMMARY

A tiller includes a tiller frame and an upright assembly extending from the frame. The frame is supported by at least one wheel and defines a cavity. A transmission assembly is supported by the frame and has an output member that is configured to be drivingly coupled to a first power source in a first battery-powered configuration and to a second power source in a second electric-powered configuration. A tilling implement includes a drive shaft that is driven by the output member. The tilling implement comprises at least one tine plate. The cavity is configured to removably receive a battery in the first battery-powered configuration and removably receive a ballast in the second electric-powered configuration.

According to additional features, the tiller further includes a latch assembly that is movably coupled to the frame and configured to selectively engage the battery in the first battery-powered configuration and alternatively, engage the ballast in the second electric-powered configuration. The cavity is positioned generally above the tilling implement. The first power source includes a battery-powered motor. The tiller further comprises the battery, wherein the battery is configured to supply a current to the battery-powered motor in an installed position.

According to other features, the tiller further comprises the ballast. The ballast has a hollow body that defines a fillable chamber. The ballast further includes a door that is movable between an open position permitting access to the chamber and a closed position that closes off access to the chamber. The cavity of the frame defines a first shape. The battery and the ballast both comprise a second shape, complementary to the first shape on respective bottom sides such that either the battery or the ballast is alternatively received by the cavity. The first shape comprises at least two grooves that extend laterally into the frame. The common second shape includes at least two projections that extend laterally from the battery and the ballast. The at least two projections are configured to be slidably accepted by the at least two grooves.

A tiller according to additional features comprises a frame supported by at least one wheel and an upright assembly extending from the frame. A drive mechanism is supported by the frame and includes a motor having an output member. A tilling implement has a drive shaft that is driven by the output member. The tilling implement comprises at least one tine plate. A height adjustment assembly is operably coupled between the frame and the at least one wheel. The height adjustment assembly comprises an arm assembly and a rack assembly. The arm assembly has a protrusion. The rack assembly has at least a first and a second groove configured to alternatively receive the protrusion. The arm assembly is configured to securably locate the protrusion into the first groove wherein the at least one wheel is located at a first elevation relative to the frame and alternatively, in the second groove wherein the at least one wheel is located at a second elevation relative to the frame. The first and second elevations are distinct.

According to other features, the arm assembly comprises a shaft, a knob, and a collar. The knob is disposed on a terminal end of the shaft. The collar is configured to slidably translate along the shaft. Translation of collar causes movement of the protrusion relative to the rack assembly. The knob and collar are configured for one-handed operation for moving the protrusion from one of the first and second grooves to the other of the first and second grooves. The collar defines an opening that receives the shaft. The collar extends 360 degrees laterally outwardly beyond the shaft. The collar has a rounded sidewall on an end opposite the knob. The rack assembly comprises a pair of opposing racks that receive the shaft therebetween. The rack assembly has three pairs of grooves that selectively and alternatively receive the protrusion. The protrusion includes a first and second protrusion that oppositely extend from the shaft.

According to still other features, the collar is biased in a direction that urges the protrusion toward one of the three pairs of grooves. The tiller further comprises a link assembly that is connected between the height adjustment assembly and the at least one wheel. The link assembly comprises a first link and a second link. The first link is pivotally coupled to the height adjustment assembly and to the second link. The second link is pivotally coupled to the frame and the at least one wheel. The tiller further comprises a drag bar that is operably interconnected to the link assembly. Movement of the height adjustment assembly results in movement of the drag bar.

A tiller according to other features of the instant application includes a frame supported by at least one wheel and an upright assembly extending from the frame. A drive mechanism is supported by the frame and includes a motor having a motor output member. A tilling implement has a drive shaft that is driven by the motor output member. The tilling implement comprises at least one tine plate. A transmission assembly drivingly connects the motor output member to the drive shaft. The transmission assembly comprises a first planetary gear assembly and a second planetary gear assembly. The first planetary gear assembly has a first output member that provides a first gear reduction from the motor output member. The second planetary gear assembly has a second output member that provides a second gear reduction from the first output member.

According to other features, the tiller further comprises a worm gear assembly. The worm gear assembly includes a worm that is drivingly connected to the second output member and a worm gear that is driven by the worm. The worm gear operably drives the drive shaft.

In other features, an electric-powered tiller includes a frame supported by at least one wheel. The frame defines a cavity. An upright assembly extends from the frame. A transmission assembly is supported by the frame and has an input member and an output member. The input member is drivingly coupled to an electric-powered motor. A tilling implement has a drive shaft that is driven by the output member. The tilling implement comprises at least one tine plate. A ballast is selectively received in the cavity and is configured to provide additional mass to the frame and to urge the tine plate into engagement with a working surface.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIGS. 8-10 are partial sectional views of the slider assembly of FIG. 7 showing an exemplary sequence for moving the tiller from a transportation mode (FIG. 8) to a tilling mode (FIG. 10);

DETAILED DESCRIPTION

Figure 1:
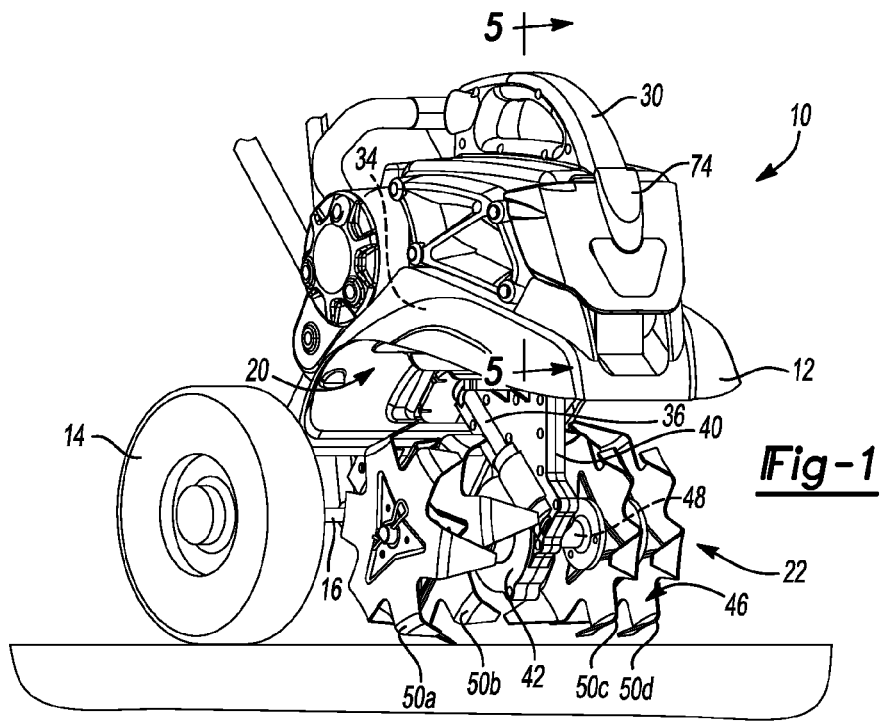
FIG. 1 is a front perspective view of a battery-powered tiller constructed in accordance with one example of the present teachings and shown with a battery in an installed position.
Figure 2:
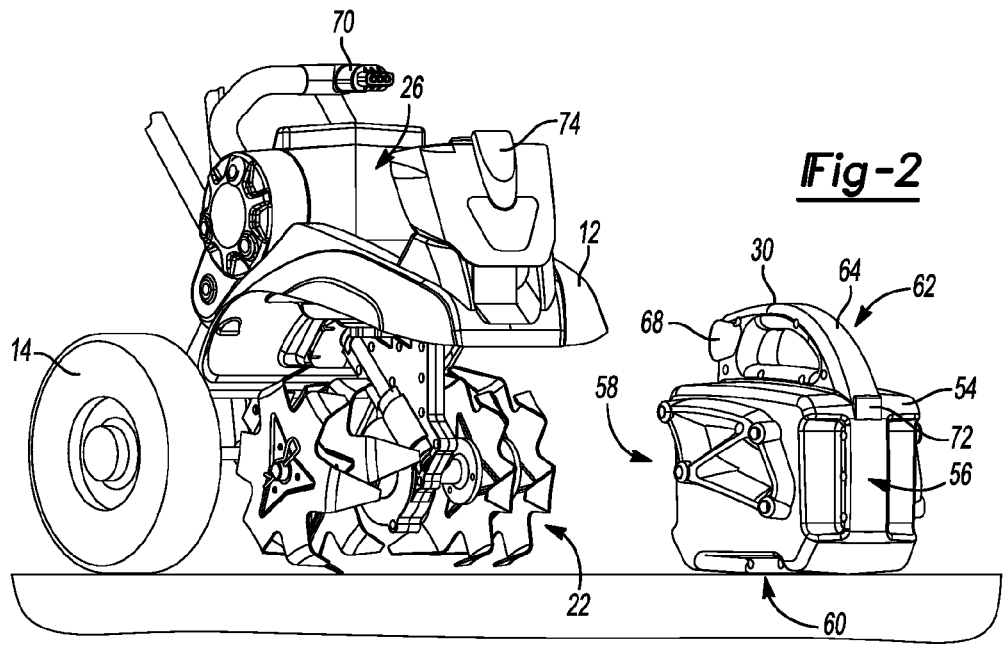
FIG. 2 is a front perspective view of the battery-powered tiller of FIG. 1 and shown with the battery removed.
Figure 3:
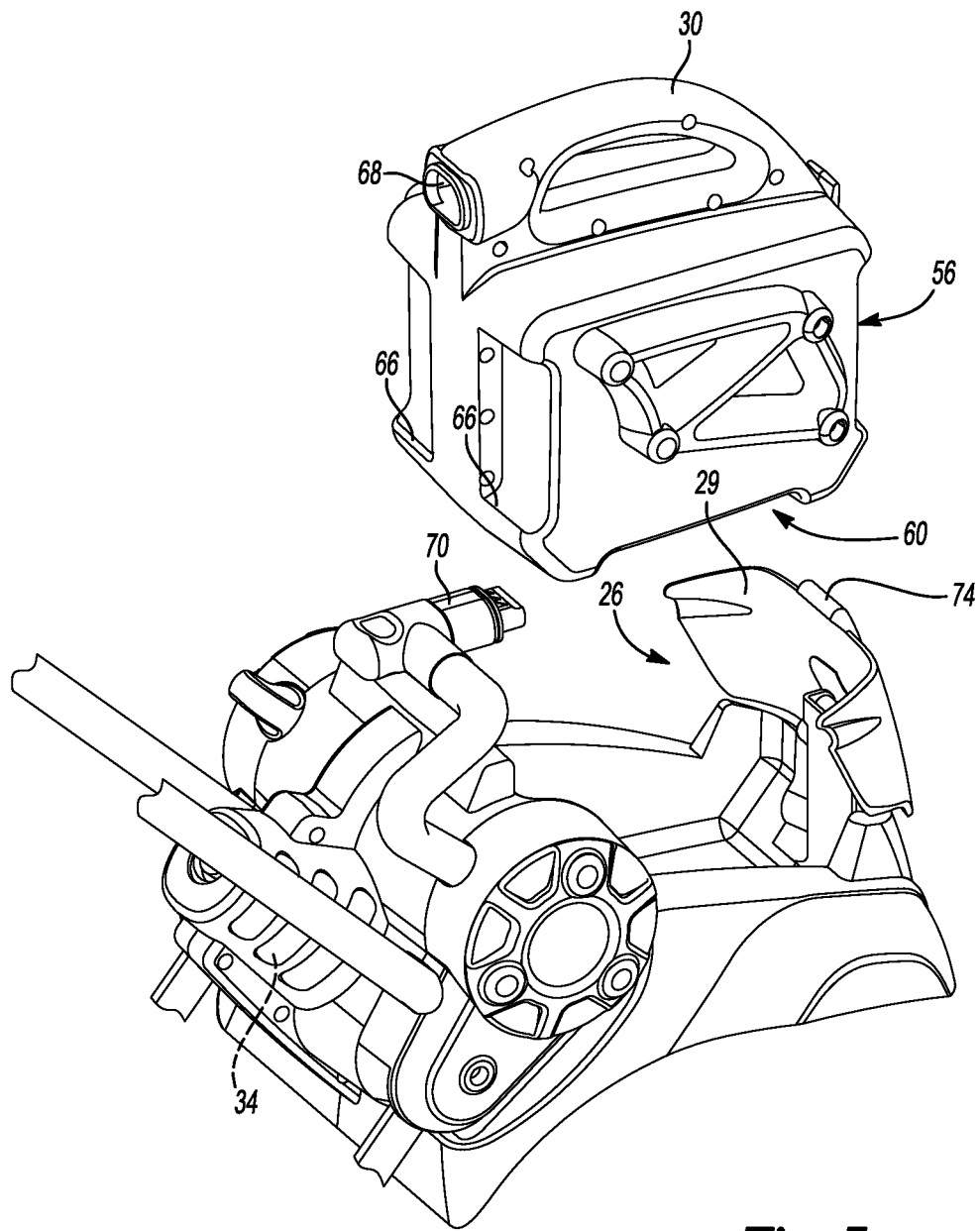
FIG. 3 is an exploded side perspective view of the battery and battery receiving portion.
Figure 4:
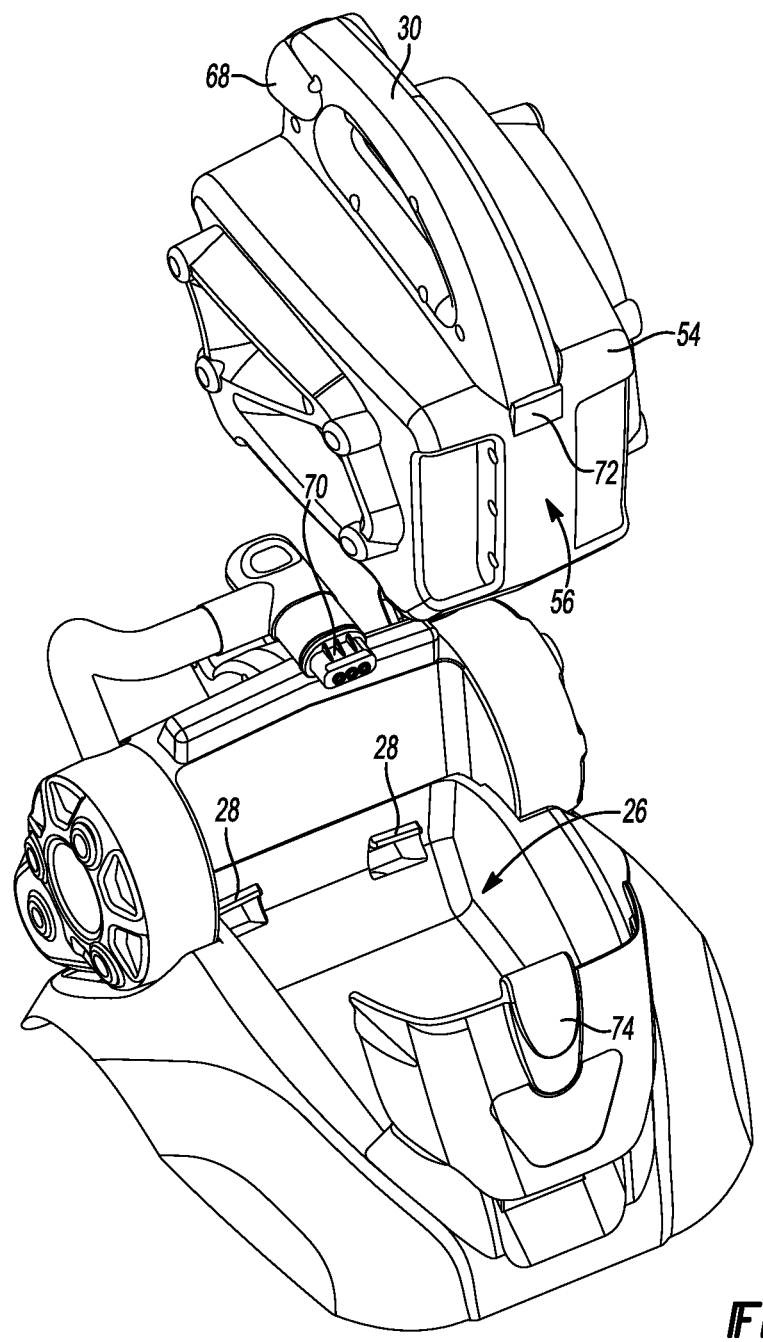
FIG. 4 is an exploded front perspective view of the battery and battery receiving portion.

With initial reference to FIGS. 1-6, a battery-powered tiller constructed in accordance with the present teachings is shown and generally identified at reference numeral 10. The tiller 10 generally comprises a frame 12 supported by a pair of wheels 14 that are connected by way of an axle 16. The tiller 10 further includes a driving mechanism 20, a tilling implement 22, and an upright assembly 24. The frame 12 also defines a receiving portion 26 (FIG. 2) including a pair of L-shaped tabs 28 (FIGS. 4 and 5) and a battery guide 29 (FIGS. 3 and 4). The receiving portion 26 is configured to receive a battery 30 in an installed position (FIG. 1).

The drive mechanism 20 includes a motor 34 having an output member 36. The output member 36 is connected at a first portion to the motor 34 and at a second portion to the tilling implement 22 and communicate a rotational output from the motor 34 to a rotational output of the tilling implement 22. The output member 36 is configured as a longitudinal shaft that is supported at least partially by an axle support 40 and a gear housing 42.

The tilling implement 22, as will be discussed in greater detail herein, generally defines a plurality of tine plates (collectively referred to at reference 46) that are rotatably supported by a drive shaft (axle) 48. In the example shown, the plurality of tines 46 include a first tine plate 50a, a second tine plate 50b, a third tine plate 50c, and a fourth tine plate 50d.

The battery 30 according to the present teachings provides thirty-six volts direct current (DC). It is appreciated that the battery 30 can be configured to provide other voltages, such as between 12 volts and 60 volts DC. One suitable battery configuration providing thirty-six volts direct current is discussed in commonly owned U.S. patent application Ser. No. 12/426,499, entitled "Mower", which is expressly incorporated herein by reference. As can be appreciated, the battery 30 provides a current to the motor 34 when installed for driving the tilling implement 22.

The battery 30 generally defines a free standing box-like housing 54 (see FIG. 2). The housing 54 is generally defined by a forward side 56, a rearward side 58, a bottom side 60, and an upper side 62. A handle 64 is located on the upper side 62 in a generally centralized location extending upward from the housing 54. A pair of rear heels 66 are defined on the housing 54. As will be described, the heels 66 cooperatively engage the L-shaped tabs 28 (FIG. 5) in an installed position. A first mating portion 68 is defined on the handle 64 that is configured to mechanically and electrically mate with a second mating portion 70 defined on the frame 12 of the battery-powered tiller 10. The housing 54 further includes a catch 72 formed on the forward side 56 in a location generally opposite of the first mating portion 68.

Figure 5:
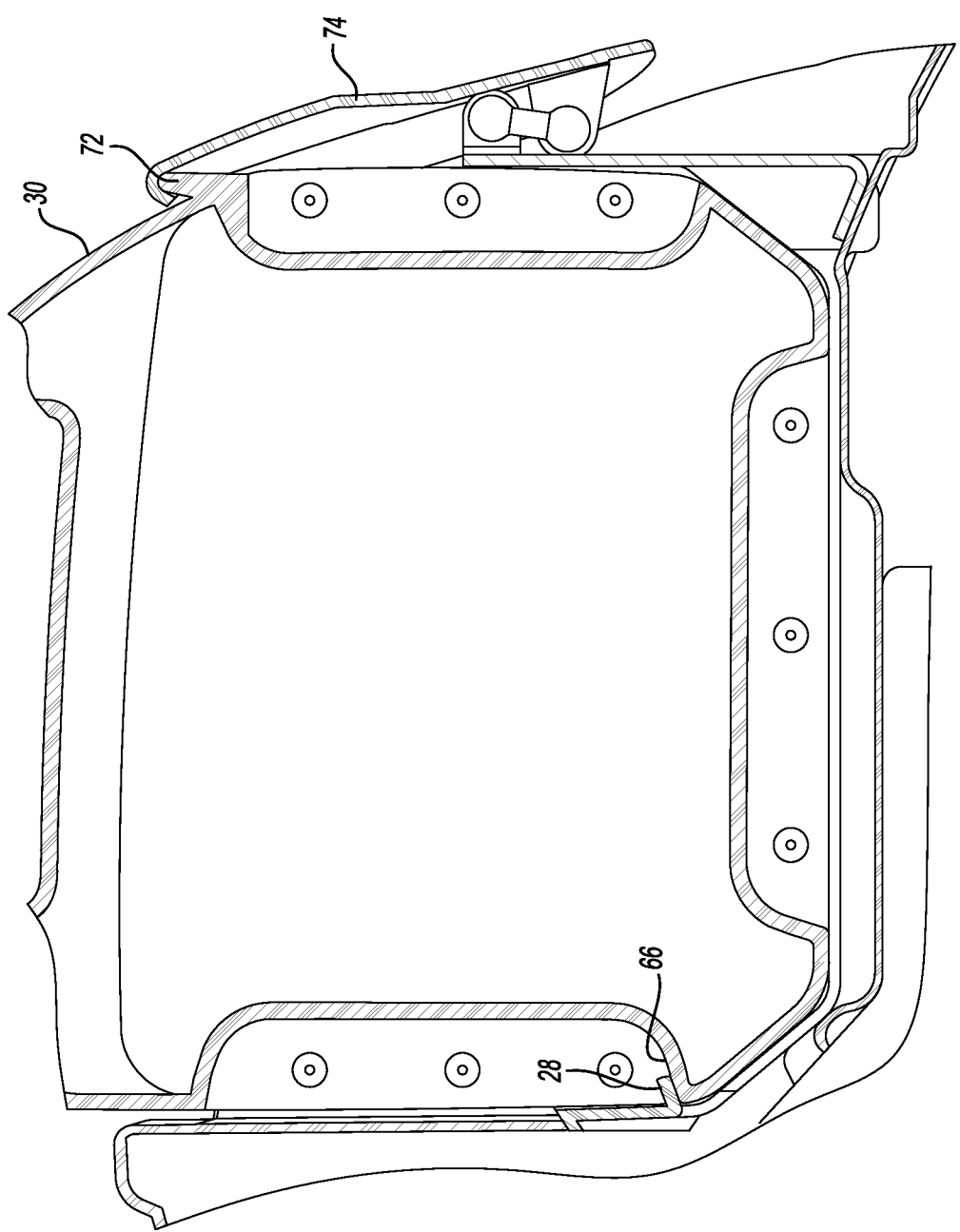
FIG. 5 is a cut-away view of the battery shown installed in to the battery receiving portion.

In the preferred method of securing the battery 30 to the receiving portion 26 of the battery-powered tiller 10, a user first aligns the contour of the battery housing 54 with the guide 29 defined on the frame 12. The battery 30 is then advanced downwardly (i.e., further into the receiving portion 26) allowing the respective heels 66 to positively engage the L-shaped tabs 28 (FIG. 5). The catch 72 defined on the battery 30 is then mechanically coupled with a latch 74 defined on the frame 12 at a location generally proximate to the receiving portion 26. An audible "click" can be observed by the user once sufficient rotation of the battery 30 into the receiving portion 26 causes the catch 72 to be secured with the latch 74. An electrical connection can then be established by mating the portion 70 of the tiller 10 to the portion 68 of the battery 30. To remove the battery 30 from the receiving portion 26, a user manipulates (such as move in a downward direction as viewed in FIG. 1) the latch 74 to disengage the catch 72 of the battery 30 for removal.

The battery 30 is located in a generally centralized location on the frame 12 above the tilling implement 22 and intermediate of the wheels 14. In this way, the center of gravity of the battery 30 can be efficiently managed by an operator with the tilling implement 22 and the resultant "stance" of the wheels 14. The battery 30 can also be located elsewhere on the tiller 10.

Figure 6:
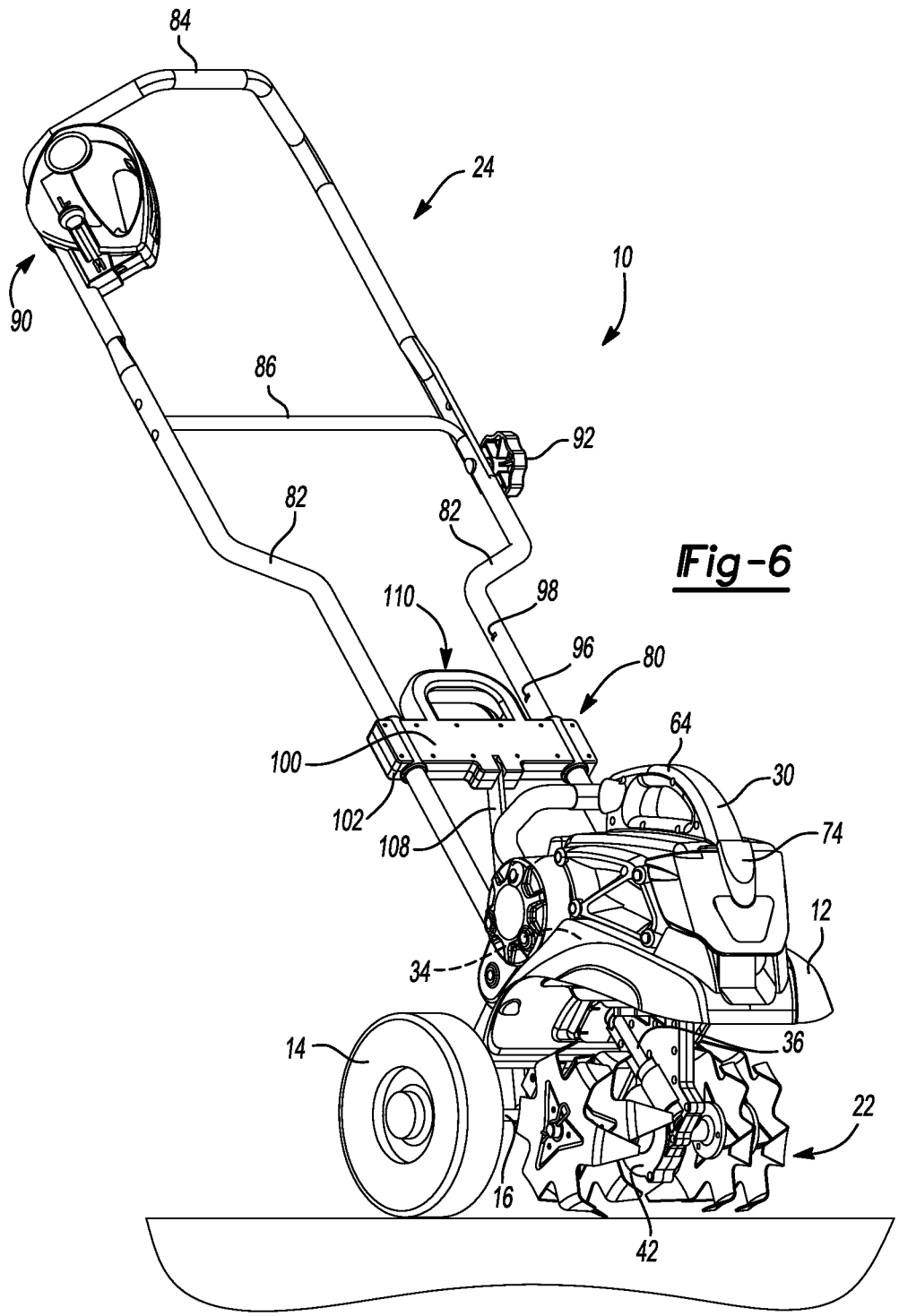
FIG. 6 is a front perspective view of the battery-powered tiller of FIG. 1 and showing an upright assembly according to one example.

With specific reference now to FIG. 6, the upright assembly 24 will be described in greater detail. The upright assembly 24 defines a slider assembly 80, a pair of longitudinal members or lower uprights 82, a handlebar 84, a cross-member 86, and a speed control 90. A knob 92 is selectively secured to one of the lower uprights 82 for selectively coupling the handlebar 84 to the lower upright 82. As will be described in greater detail, the slider assembly 80 is configured to slidably actuate along the lower uprights 82 to adjustably locate the height of the wheels 14 (i.e., relative to the ground and tilling implement 22).

Figure 7:
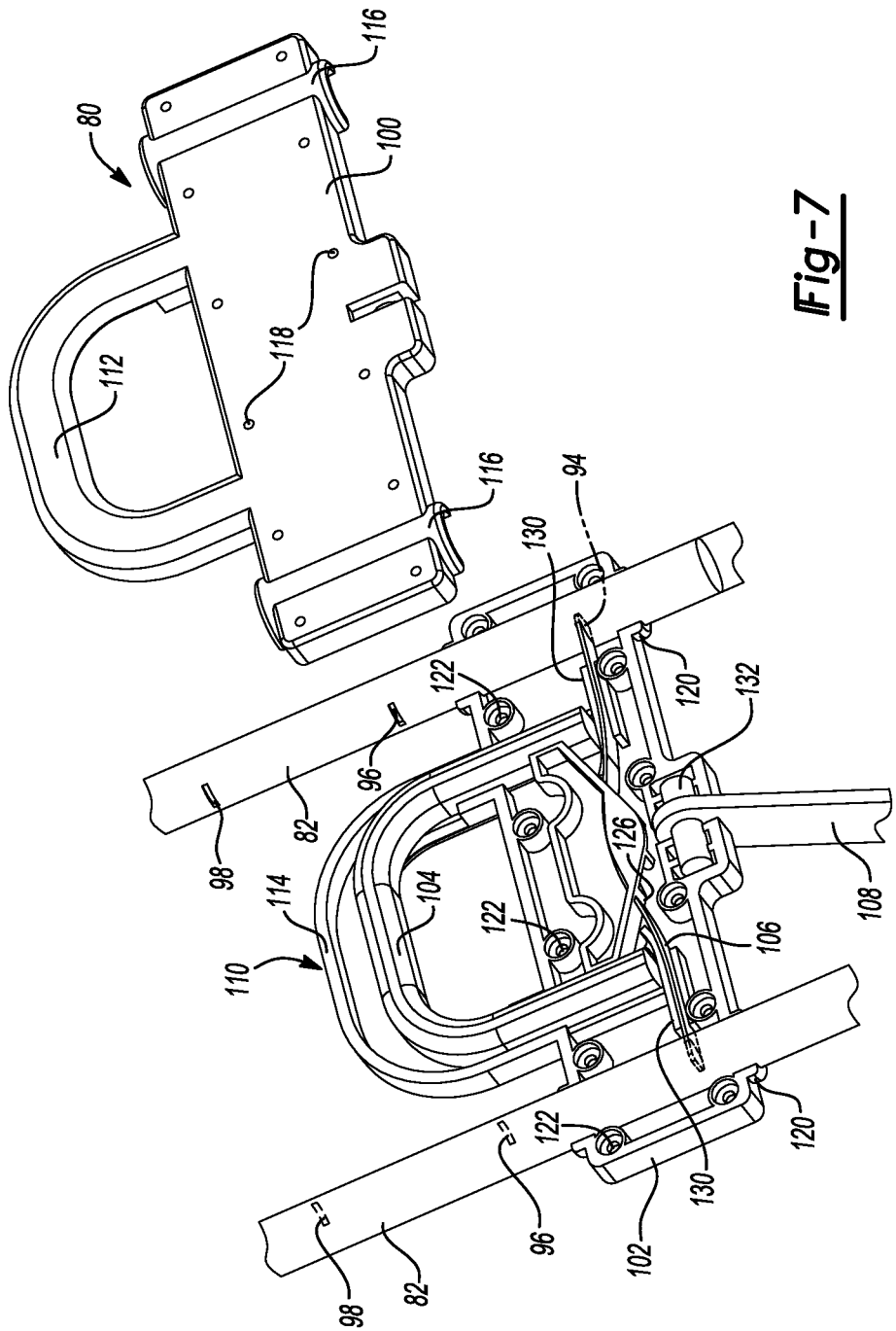
FIG. 7 is a partial exploded perspective view of a slider assembly of the battery-powered tiller of FIG. 1.

With additional reference now to FIGS. 7-10, additional features of the slider assembly 80 and the lower upright 82 will be described in greater detail. Those skilled in the art will readily appreciate that while the slider assembly 80 is shown operatively associated with a tiller configured for electrical (battery-powered) operation, the slider assembly 80 may be used in tillers having other configurations such as those powered by internal combustion engines for example. In the example shown, the lower upright 82 defines three pair of complementary slots. More specifically, the lower upright 82 defines a pair of transportation mode slots 94, a pair of tilling mode slots 96, and a pair of clearing mode slots 98. The slots of each pair of complementary slots oppose each other. As will be described, the slider assembly 80 is movable along the lower upright 82 to locate at the transportation mode slots 94 (such as shown in FIG. 7) for locating the wheels 14 in a transportation mode (see FIG. 13), the tilling mode slots 96 for locating the wheels 14 at a tilling mode location (see FIG. 14) and the clearing mode slots 98 for locating the wheels 14 in a clearing mode position (see FIG. 15).

Returning now to FIG. 7, the slider assembly 80 generally defines a front housing 100, a rear housing 102, a handle 104, a sliding bar 106, and a first link 108. A handle grip assembly 110 is generally defined by the handle 104, a front gripping portion 112 defined on the front housing 100 and a rear gripping portion 114 defined on the rear housing 102. The front housing 100 defines a pair of front channels 116 and a plurality of apertures 118. The rear housing 102 defines a pair of rear channels 120 and a plurality of blind bores 122. The front channels 116 and the rear channels 120 cooperate in an assembled position to define complementary sleeves for receiving the respective lower uprights 82. While not specifically shown, fasteners can be passed through the respective apertures 118 of the front housing 100 and into the blind bores 122 defined on the rear housing 102 to couple the respective front and rear housings 100 and 102.

The handle 104 defines a finger 126 that captures a central portion of the sliding bar 106. The rear housing 102 includes a pair of guides 130 that provide a track for guiding the sliding bar 106 into and out of engagement with the respective slots 94, 96 and 98. In one example, the sliding bar 106 can be formed of rigid material such as stamped metal.

An exemplary method of using the slider assembly 80 will now be described. Here, a user grasps the handle grip assembly 110 and urges the handle 104 in a generally upright direction (as viewed in FIGS. 8-10). Movement of the handle 104 from an "engaged" position (i.e., with a pair of slots 94, 96 or 98) to a "disengaged" position is represented pictorially from FIG. 8 to FIG. 9. As the handle 104 is moved in the upright direction (identified by the arrow in FIG. 9), the finger 126 (FIG. 7) urges the central portion of the sliding bar 106 in the same upright direction, which ultimately reduces the operating length of the sliding bar 106 and causes the distal ends of the sliding bar 106 to withdraw from a respective slot (such as the transportation mode slots 94 identified in FIG. 8).

Once the distal ends of the sliding bar 106 have been withdrawn from the respective slots (i.e., such as slots 94), a user is free to translate the slider assembly 80 along the lower upright 82 and into alignment with a desired pair of slots (i.e., either of the other pair of slots 96 or 98). Movement of the slider assembly 80 along the lower uprights 82 ultimately causes the first link 108 to urge the wheels 14 between the respective transportation mode position (FIG. 13), tilling mode position (FIG. 14) and clearing mode position (FIG. 15). The first link 108 is pivotally secured at a first end to the slider assembly 80 by way of an axle 132 that is nested in a portion of the rear housing 102.

Figure 11:
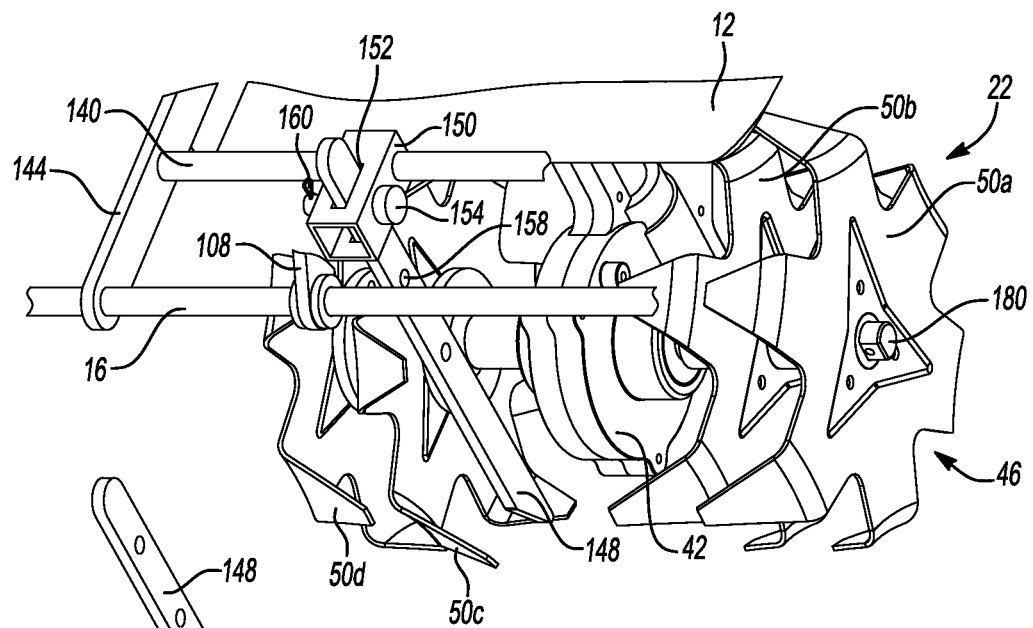
FIG. 11 is a rear perspective view of a tilling implement of the battery-powered tiller of FIG. 1 and shown with an exemplary drag bar in an installed position.
Figure 12:
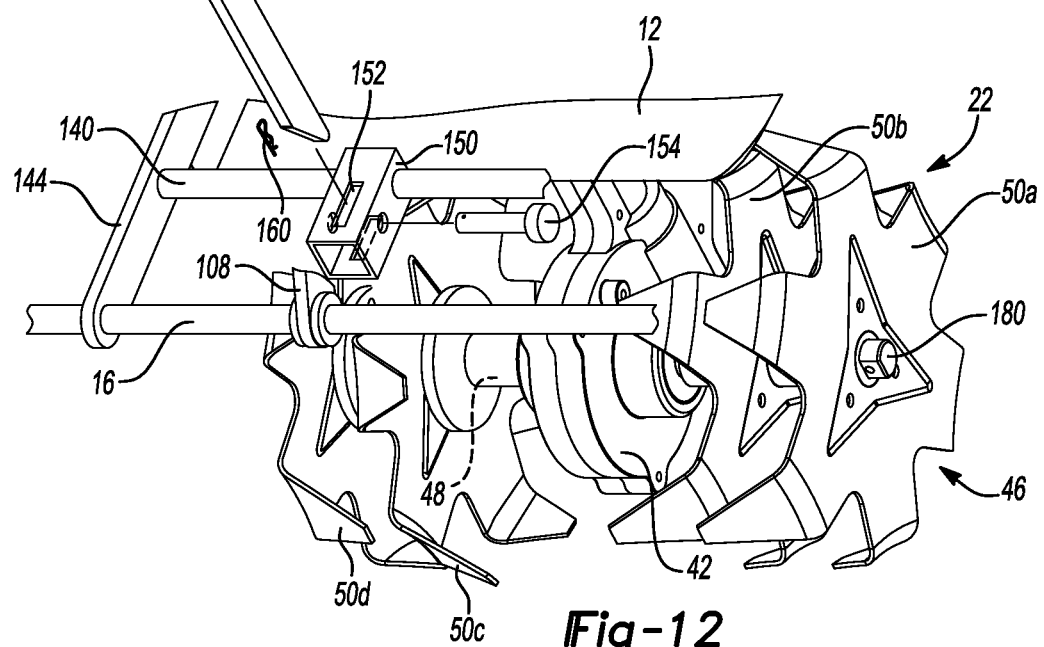
FIG. 12 is a rear perspective view of the tilling implement of FIG. 11 and shown with the drag bar in an exploded position.
Figure 16:
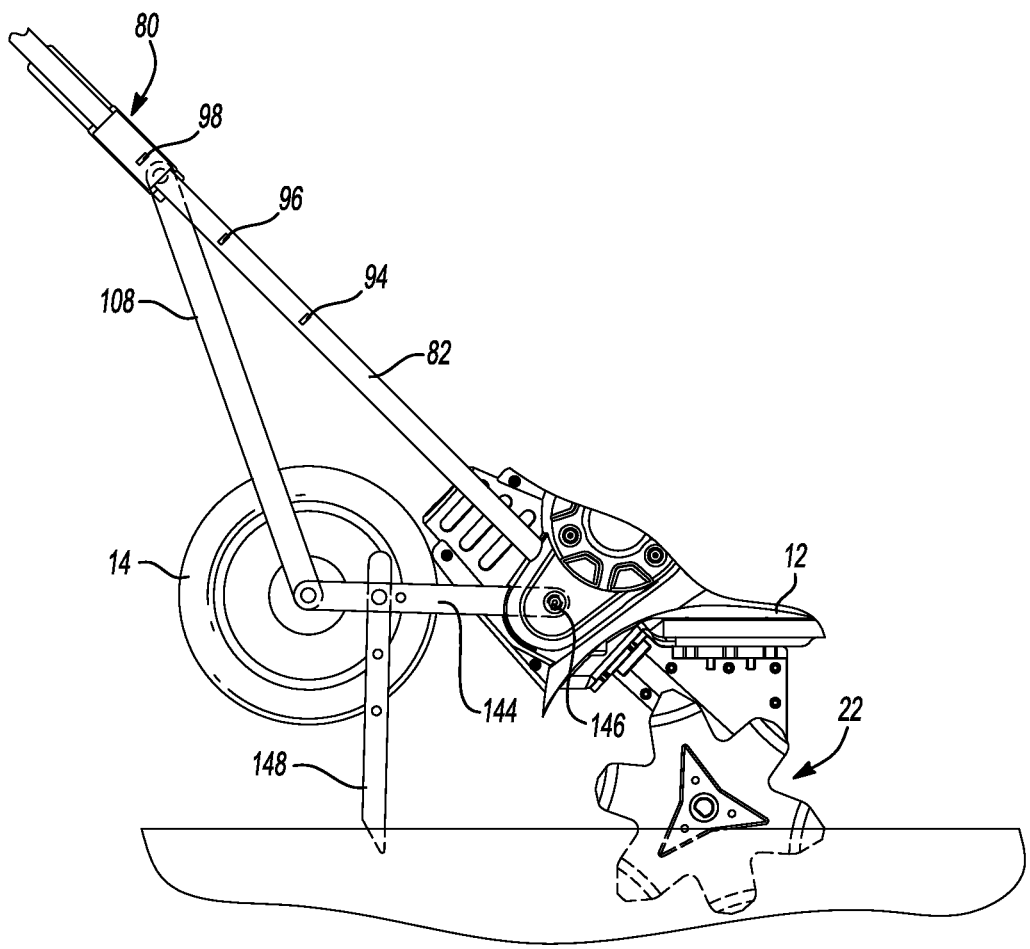
FIG. 16 is a side view of the battery-powered tiller of FIG. 1 and shown in a clearing mode with the drag bar coupled thereto.

With reference now to FIGS. 11 and 12, additional features of the frame 12 of the battery-powered tiller 10 will be described in greater detail. The frame 12 further includes a stabilizing bar 140 that is connected between a pair of second links 144. For clarity, only one of the second links 144 is shown in FIGS. 11 and 12. The second links 144 receive the wheel axle 16 at first ends and are rotatably coupled at a pivot joint 146 (FIG. 13) at an opposite end. The second links 144 can be secured to the stabilizing bar 140 at an intermediate location. A drag bar 148 can be adjustably secured to the stabilizing bar 140 by way of a coupler 150. The coupler 150 defines a slot 152 for receiving a first end of the drag bar 148. A peg 154 is selectively passed through various apertures 158 formed in the drag bar 148 to adjust the operating height of the drag bar 148. A pin 160 can selectively mate with the peg 154 for locating the drag bar 148 at the desired operating position. By way of example, the drag bar 148 is shown in the transportation mode (FIG. 13), and the clearing mode (FIG. 16).

Figure 13:
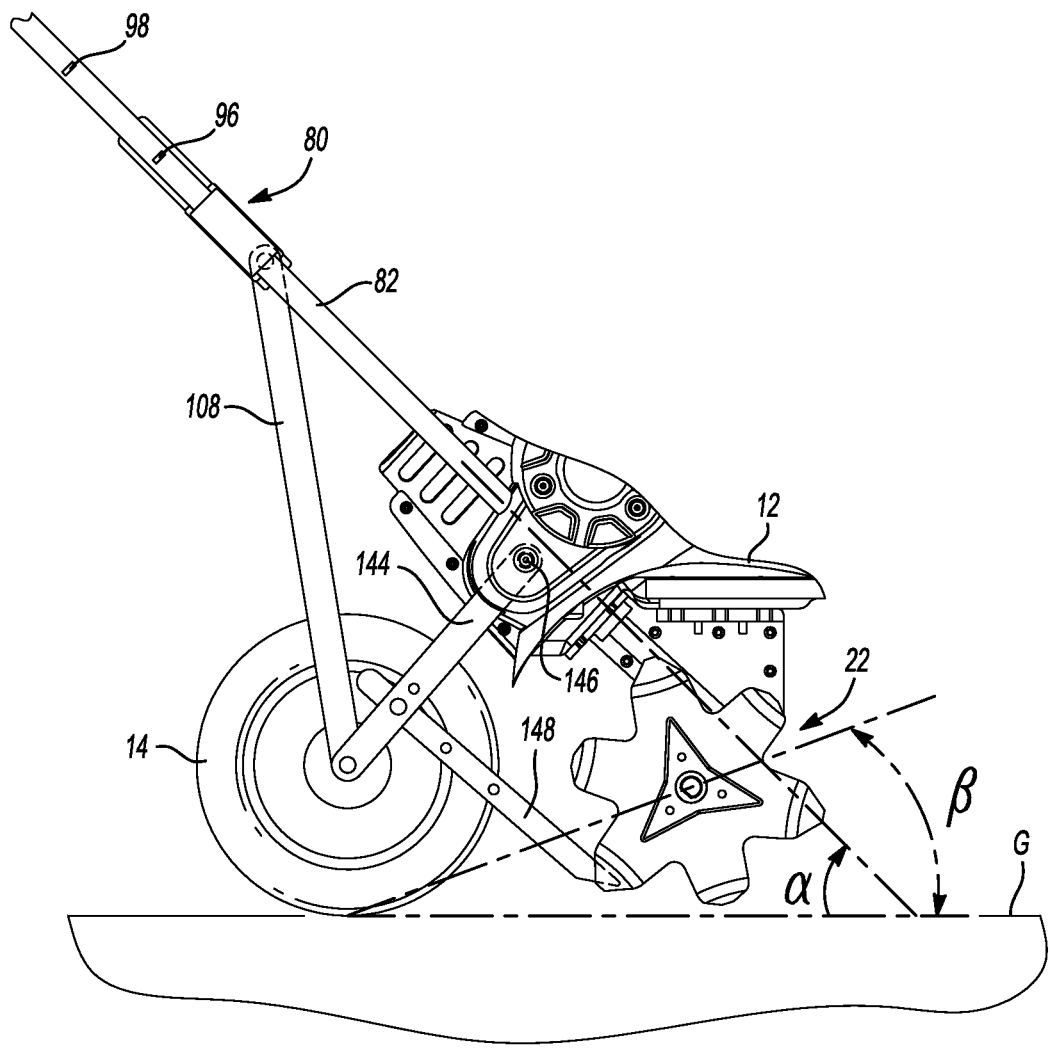
FIG. 13 is a side view of the battery-powered tiller of FIG. 1 and shown in the transportation mode.
Figure 14:
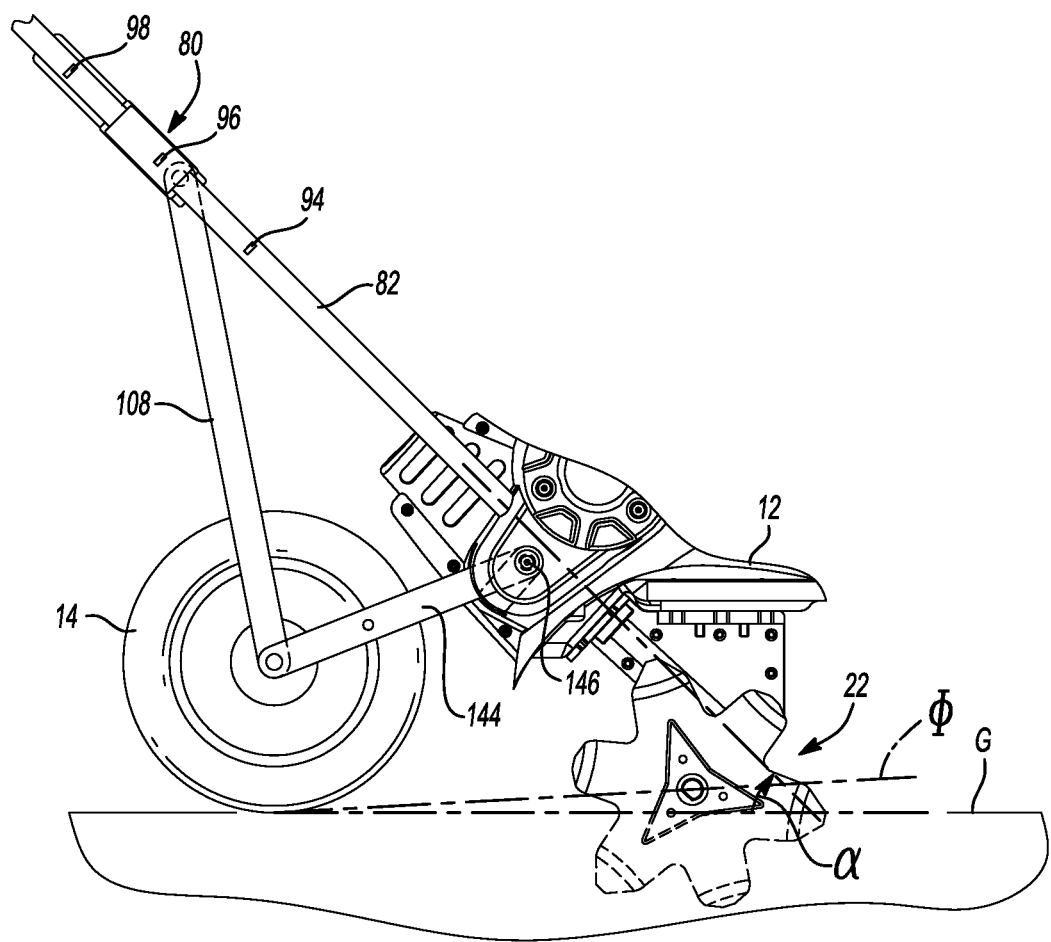
FIG. 14 is a side view of the battery-powered tiller of FIG. 1 and shown in the tilling mode.
Figure 15:
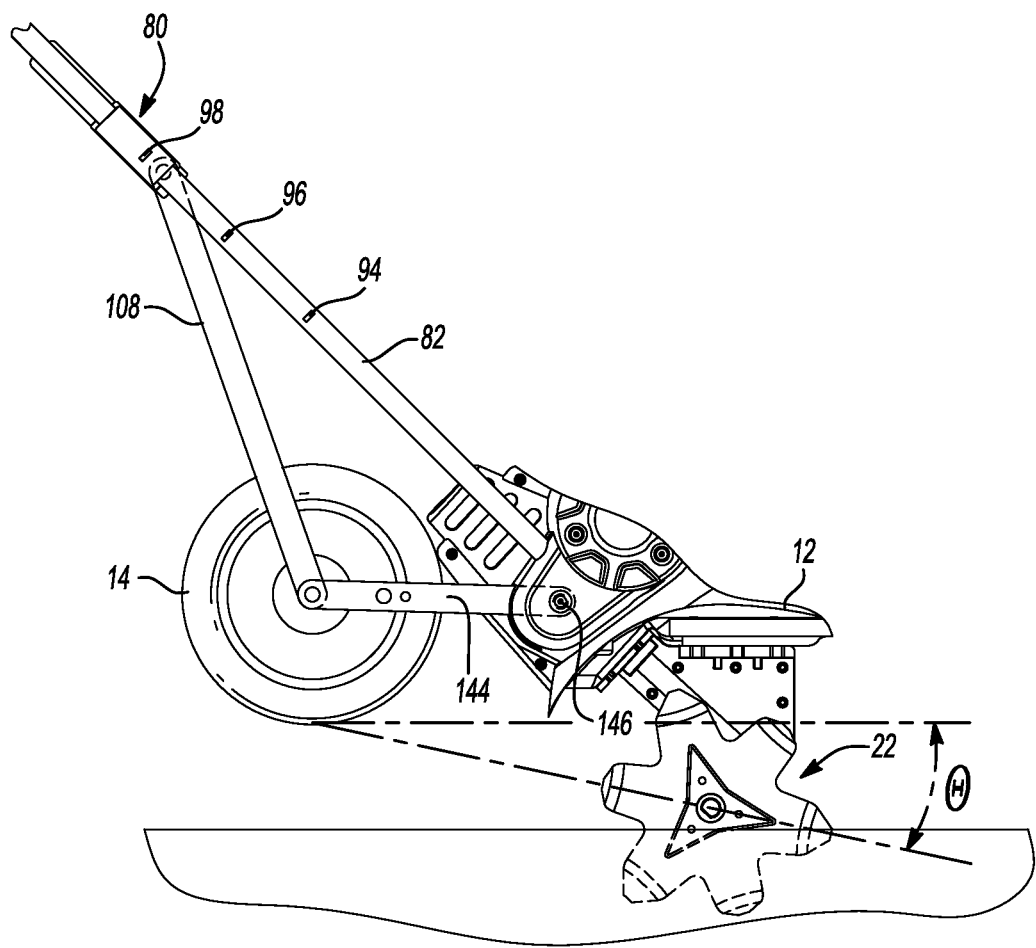
FIG. 15 is a side view of the battery-powered tiller of FIG. 1 and shown in a clearing mode.

Of note, the lower uprights 82 and consequently the upright assembly 24 as a whole defines substantially the same angle α relative to ground G in the transportation mode (FIG. 13) and the tilling mode (FIG. 14). In one example, α can be about 45 degrees. Other angles are contemplated. As shown in FIGS. 13 and 14, the angular relationship of the first link 108 and the second links 144 change to alter the position of the tilling implement 22 without changing the angular orientation of the upright assembly 24 relative to a user. The configuration can offer a streamlined transition to the user between the transportation and tilling modes. Moreover, a user need not push down or pull up on the upright assembly 24 (i.e., in an effort to locate the tilling implement 22 at a desired elevation relative to ground G) when transitioning between the transportation and tilling modes as may be required for other conventional tillers.

Also of note, an angle can be defined from a horizontal line that the wheels 14 engage the ground G to a line that extends through the axis of the tilling implement 22. This angle is represented as β and φ in FIGS. 13 and 14, respectively. The angle φ in FIG. 14 can be about 0 degrees. An angle Θ can be defined from a horizontal line that passes along the bottom of the wheels 14 and is parallel to the ground G and a line that extends through the axis of the tilling implement 22.

Figure 17:
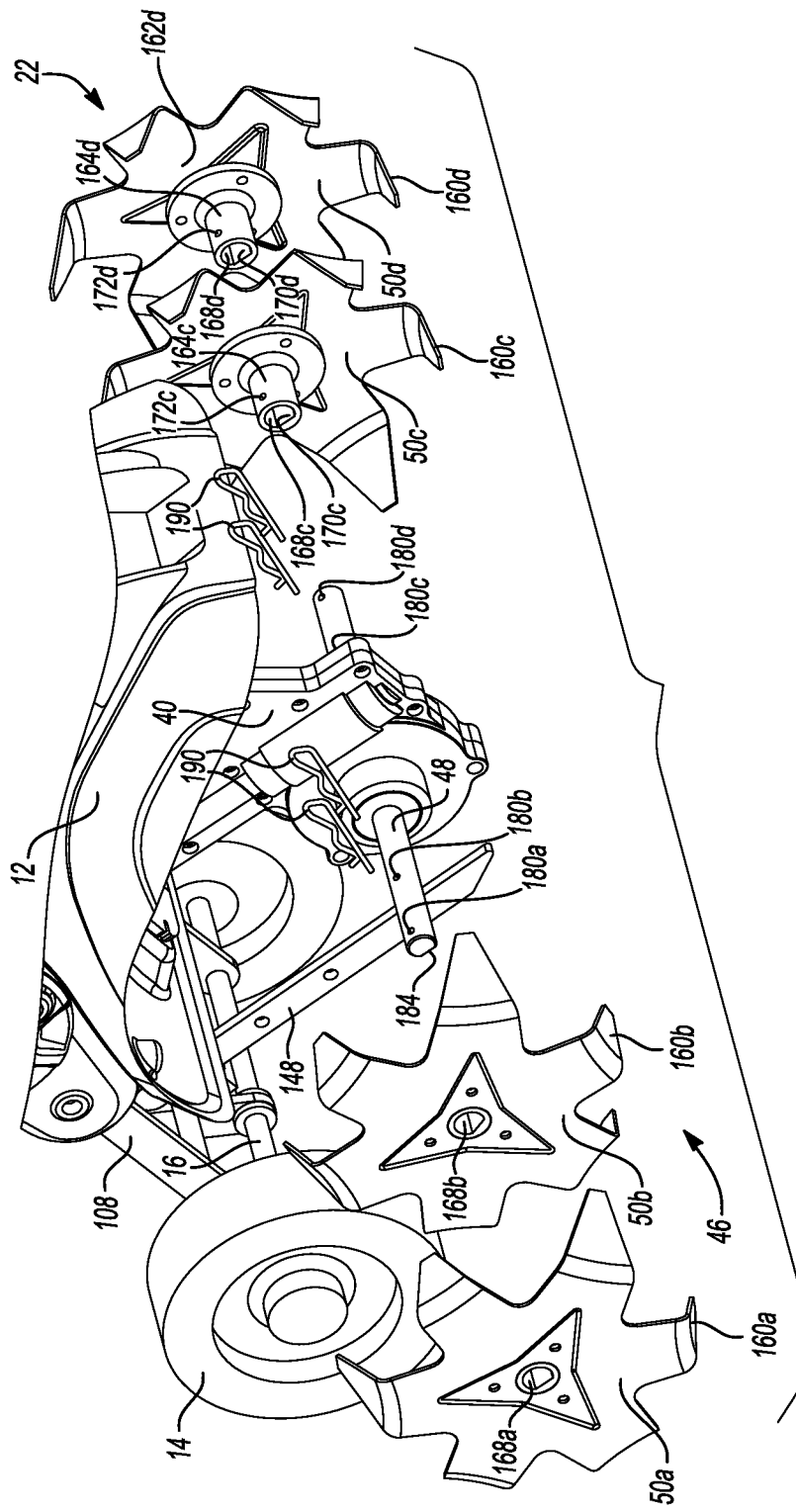
FIG. 17 is an exploded front perspective view of the tilling implement of the battery-powered tiller of FIG. 1 and shown with the tine plates in a first configuration.
Figure 18:
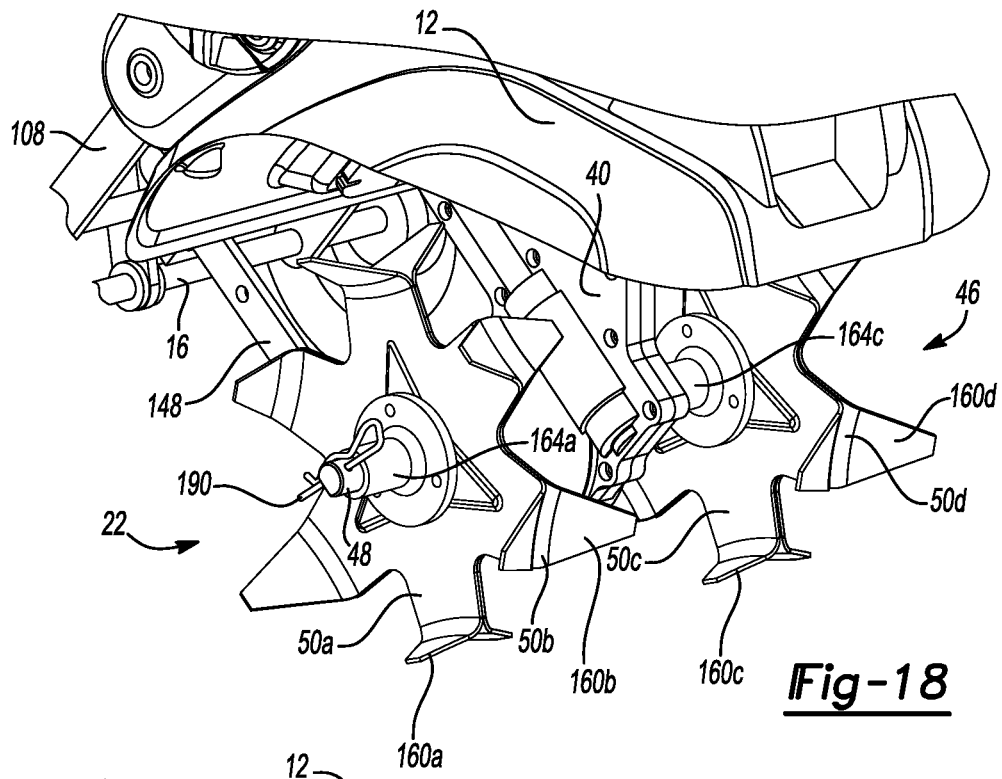
FIG. 18 is a front perspective view of the tilling implement and shown with the tine plates are assembled in a second configuration.
Figure 19:
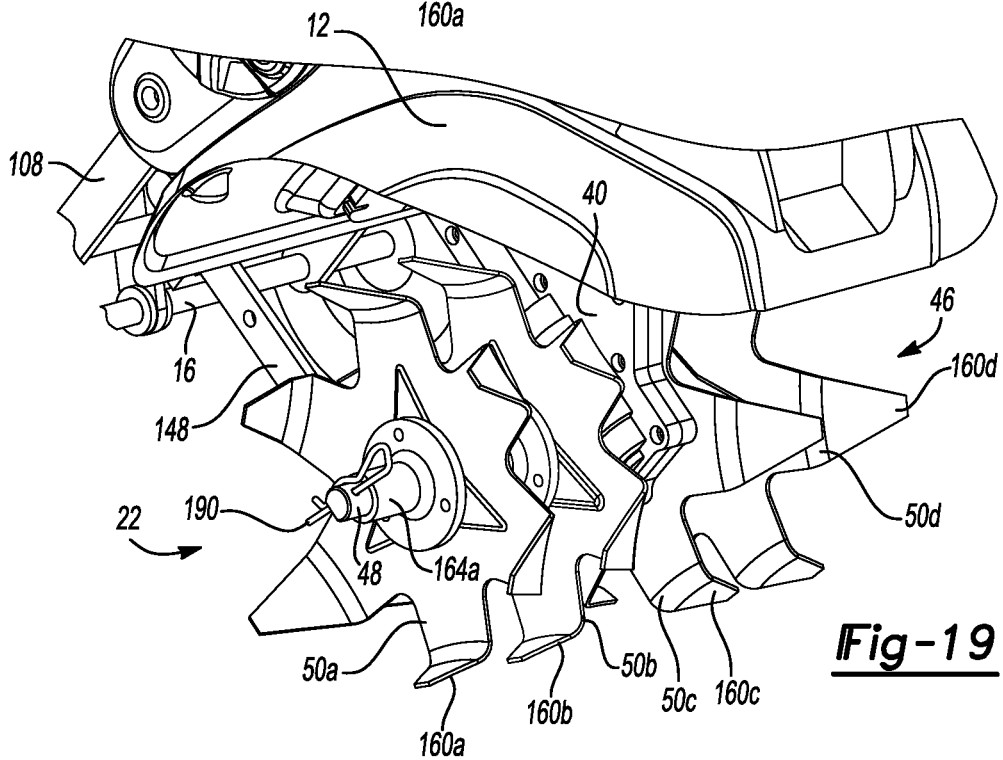
FIG. 19 is a front perspective view of the tilling implement and shown with the tine plates assembled in a third configuration.
Figure 20:
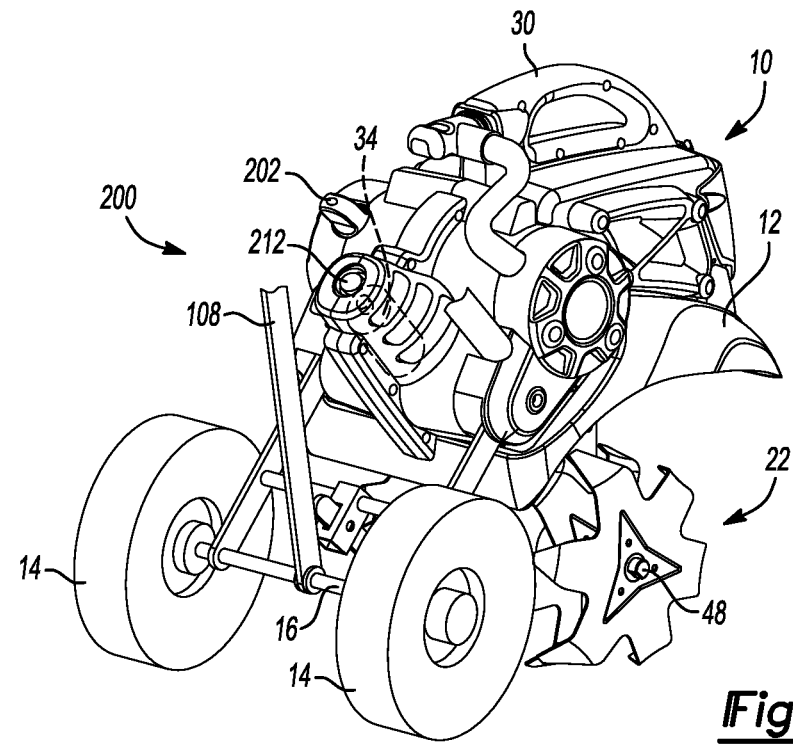
FIG. 20 is a rear perspective view of the battery-powered tiller of FIG. 1 and illustrating an unjamming mechanism according to one example of the present teachings wherein a key of the unjamming mechanism is shown inserted into a first receiver during normal operation of the battery-powered tiller.
Figure 21:
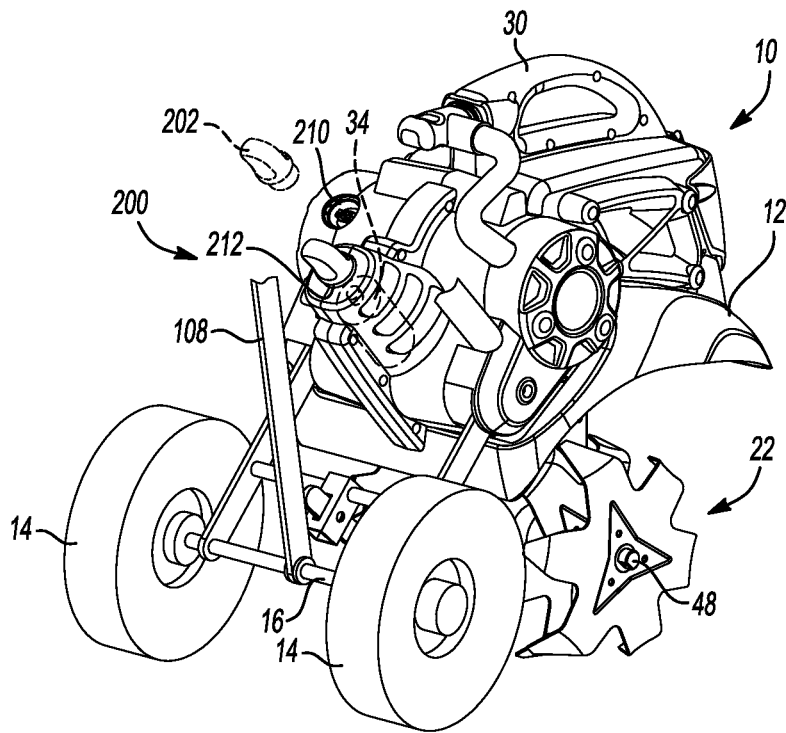
FIG. 21 is a rear perspective view of the battery-powered tiller of FIG. 20 and shown with the key removed from the first receiver and inserted into the second receiver of the unjamming mechanism.
Figure 22:
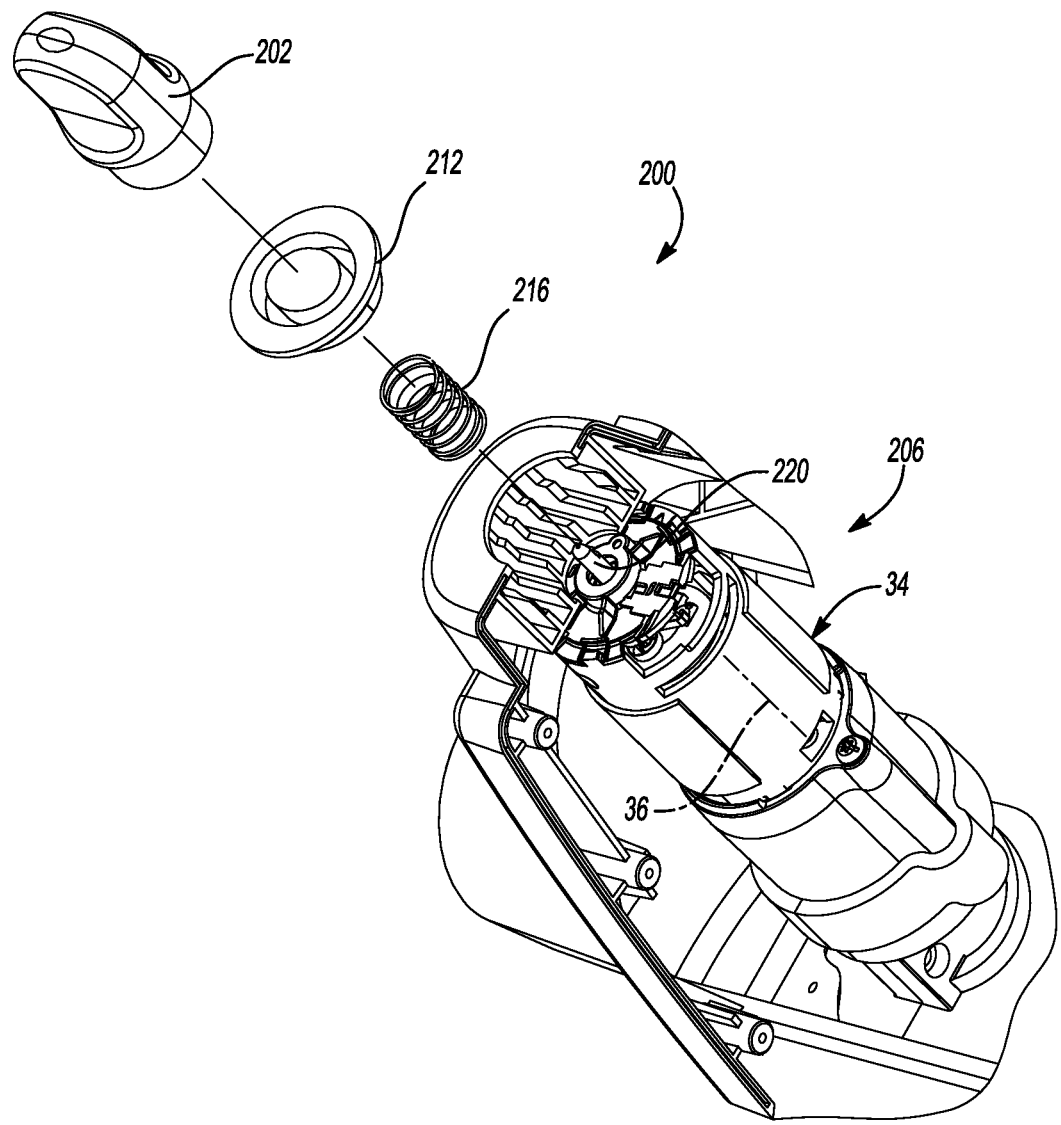
FIG. 22 is an exploded, partial cut-away view of the unjamming mechanism of FIG. 20.
Figure 23:
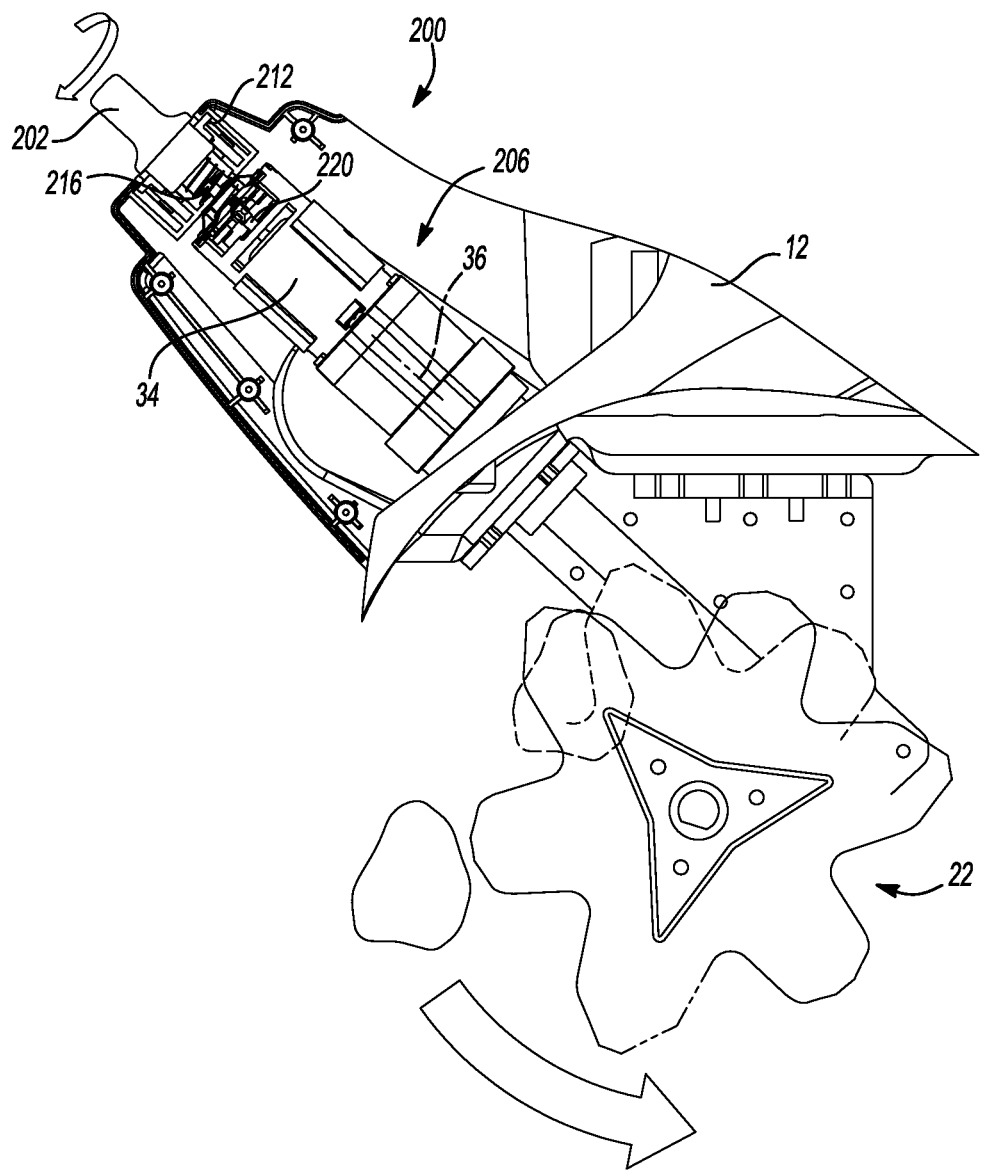
FIG. 23 is a side partial cut-away view of the unjamming mechanism of FIG. 20 wherein the key is rotated causing the tilling implement to rotate in a reverse direction and thereby free a rock from a jammed position.

Turning now to FIGS. 17-19, the tilling implement 22 according to various features will be described in greater detail. Those skilled in the art will readily appreciate that while the tilling implement 22 is shown operatively associated with a tiller configured for electrical (battery-powered) operation, the tilling implement 22 may be used in tillers having other configurations, such as those powered by internal combustion engines, for example. As identified above, the tilling implement 22 has a plurality of tine plates 46 including the first tine plate 50a, the second tine plate 50b, the third tine plate 50c, and the fourth tine plate 50d. Each of the tine plates 50a-50d is configured equivalently. In this way, only a description of one of the tine plates 50d will be described herein. However, it should be appreciated that the tine plates may be configured differently. The tine plate 50d generally defines a plurality of tines 160d extending from a central body 162d. A central hub 164d can be fixedly secured at the body 162d. The hub 164d can define a passage 168d having an axis that is perpendicular to a plane of the central body 162d. The passage 168d can be formed entirely through the tine plate 50d. The hub 164d also defines a flat portion 170d so that the passage 168d formed through the hub 164d has a cross-section similar to the letter "D". The tines 160d can be curved at their respective ends in a direction generally toward the hub 164d. The hub 164d can define an aperture 172d formed in a direction generally perpendicular to a longitudinal axis of the hub 164d.

The tilling implement 22, by way of the tilling implement drive shaft 48, is operable to communicate rotational motion onto the plurality of tine plates 46 during operation. The tilling implement drive shaft 48 defines a plurality of apertures 180a, 180b, 180c, and 180d formed therethrough. The tilling implement drive shaft 48 generally includes a longitudinal bar having a flat portion 184 defined thereon. According to the present teachings, the plurality of tine plates 46 of the tilling implement 22 can be selectively configured in various orientations along the tiller drive shaft 180. For example, the configuration illustrated in FIG. 17 provides all four tine plates 50a, 50b, 50c, and 50d having their respective tines 160a, 160b, 160c, and 160d pointed in a generally inboard direction.

In order to secure the respective tine plates 50a-50d to the tiller drive shaft 48, cotter pins 190 can be selectively secured through the respective apertures 172a-172d of hubs 164a-164d and into the corresponding aperture 180a-180d formed through the tilling implement drive shaft 48. The respective flat portions 170a-170d formed in the hubs 164a-164d can be rotatably aligned with the complementary flat portion 184 formed on the drive shaft 48 in order to properly align the respective apertures 172a-172d and 180a-180d.

In a second configuration of the tine plates 46 as illustrated in FIG. 18, the tines 160a and 160d of the first tine plate 50a and fourth tine plate 50d, respectively, are oriented generally outboard, while the tines 160b of the second tine plate 50b and the tines 160c of the third tine plate 50c are oriented in a direction generally inboard. Another configuration is shown in FIG. 19 where the tines 160a of the first tine plate 50a, the tines 160b of the second tine plate 50b, the tines 160c of the third tine plate 50c, and the tines 160d of the fourth tine plate 50d are all oriented in an outboard direction. It is appreciated that a user can simply flip a desired tine plate 50a-50d to orient the respective tines 160a-160d in either an inboard or outboard direction. It is appreciated that the versatility of the plurality of tine plates 46 of the tilling implement 22 can offer a user various tilling configurations (not all shown herein) that may be desirable according to a given tilling task. Other configurations can include operation with less than all four tine plates 50a-50d coupled to the tilling implement 22. Furthermore, because all the tine plates 50a-50d are configured the same, a user can arbitrarily select any tine plate 50a-50d in sequence during assembly.

Turning now to FIGS. 20-23, a tiller unjamming mechanism of the present teachings is shown and generally identified at reference numeral 200. The unjamming mechanism 200 generally includes a key 202, and a gearing unit 206. According to one method of operation, the key 202 is moved from a first receiver 210 to a second receiver 212 to activate the unjamming mechanism 200. In general, the key 202 is accepted by the first receiver 210 during normal operation of the battery-powered tiller 10. In the event that an object, such as a rock, becomes lodged or jammed between respective tines of the plurality of tines 46, the key 202 is removed from the first receiver 210 and inserted into the second receiver 212.

Withdrawal of the key 202 from the first receiver 210 causes the motor 34 of the drive mechanism 20 to be disconnected from electrical communication with the battery 30. Once the key 202 is located into the second receiver 212, the key 202 can be pushed (i.e., in a direction toward the second receiver 212) against a biasing force provided by a biasing member 216 and rotated in a first direction (such as counter-clockwise for example). Rotation of the key 202 rotates a gripping detail 220 extending from the gearing unit 206 of the motor 34.

The gearing unit 206 offers a mechanical advantage with the motor 34 to rotate the tilling implement 22 in a reverse direction (in a direction opposite of an operating direction). In other words, multiple rotations of the gripping detail 220, which is attached to the output member 36 associated with the motor 34, can result in a single rotation of the tilling implement 22 in a reverse direction. In one exemplary implementation, a mechanical advantage of about one hundred twenty (120) revolutions of the output shaft 222 of the motor 34 can equal one rotation of the tilling implement 22. Other ratios are contemplated. By rotating the tilling implement 22 in a reverse direction, the object, such as the rock, can be easily dislodged from the tilling implement 22. Once the tilling implement 22 has become free from obstruction, the key 202 can be withdrawn from the second receiver 212 and returned to the first receiver 210 where normal battery-powered tiller operation can resume.

Figure 24:
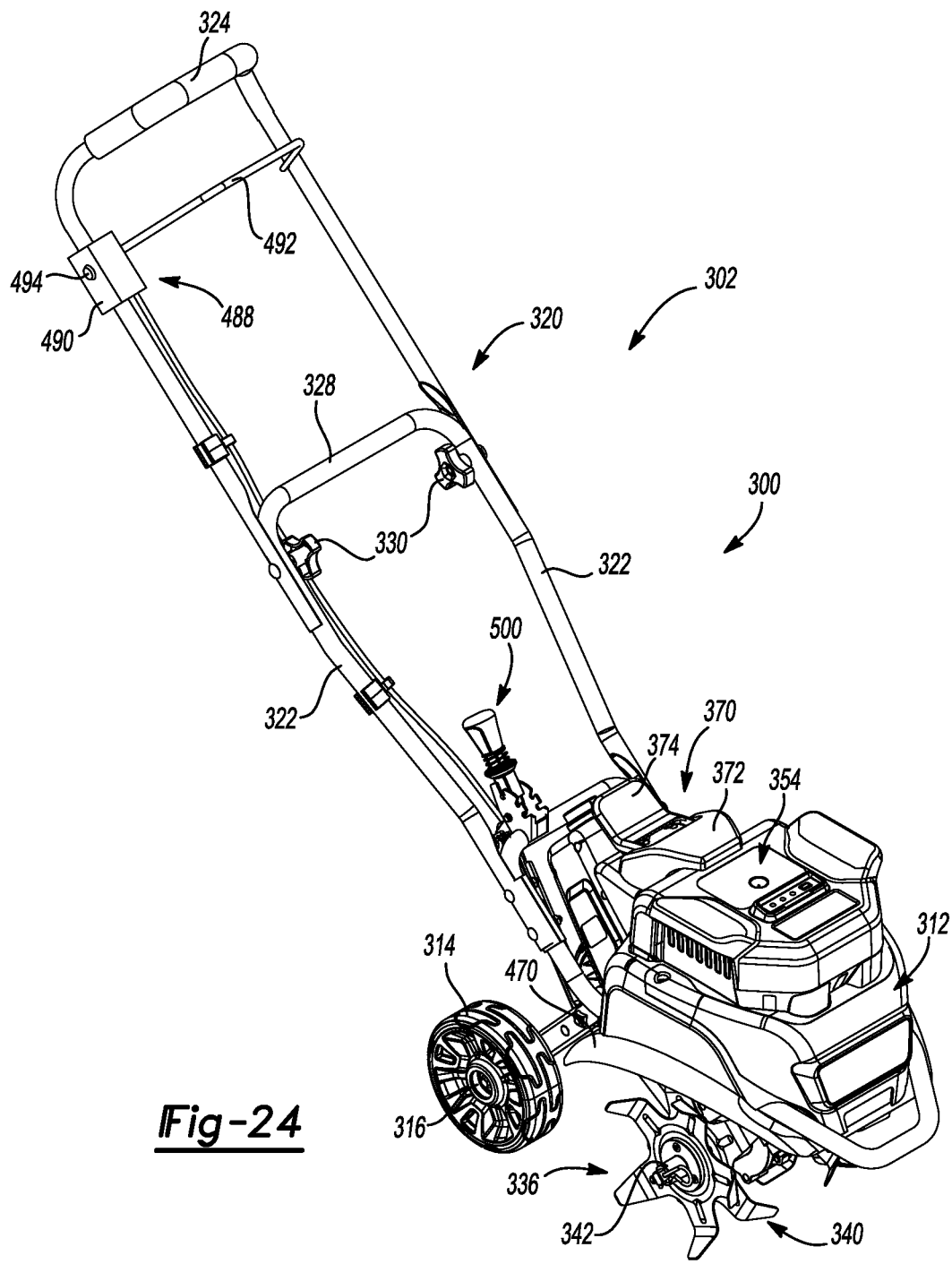
FIG. 24 is a front perspective view of the tiller configured for use in one of a first battery-powered configuration and alternatively, in a second electric-powered configuration and shown with a battery received by a cavity formed in the frame of the tiller in the first battery-powered configuration.
Figure 25:
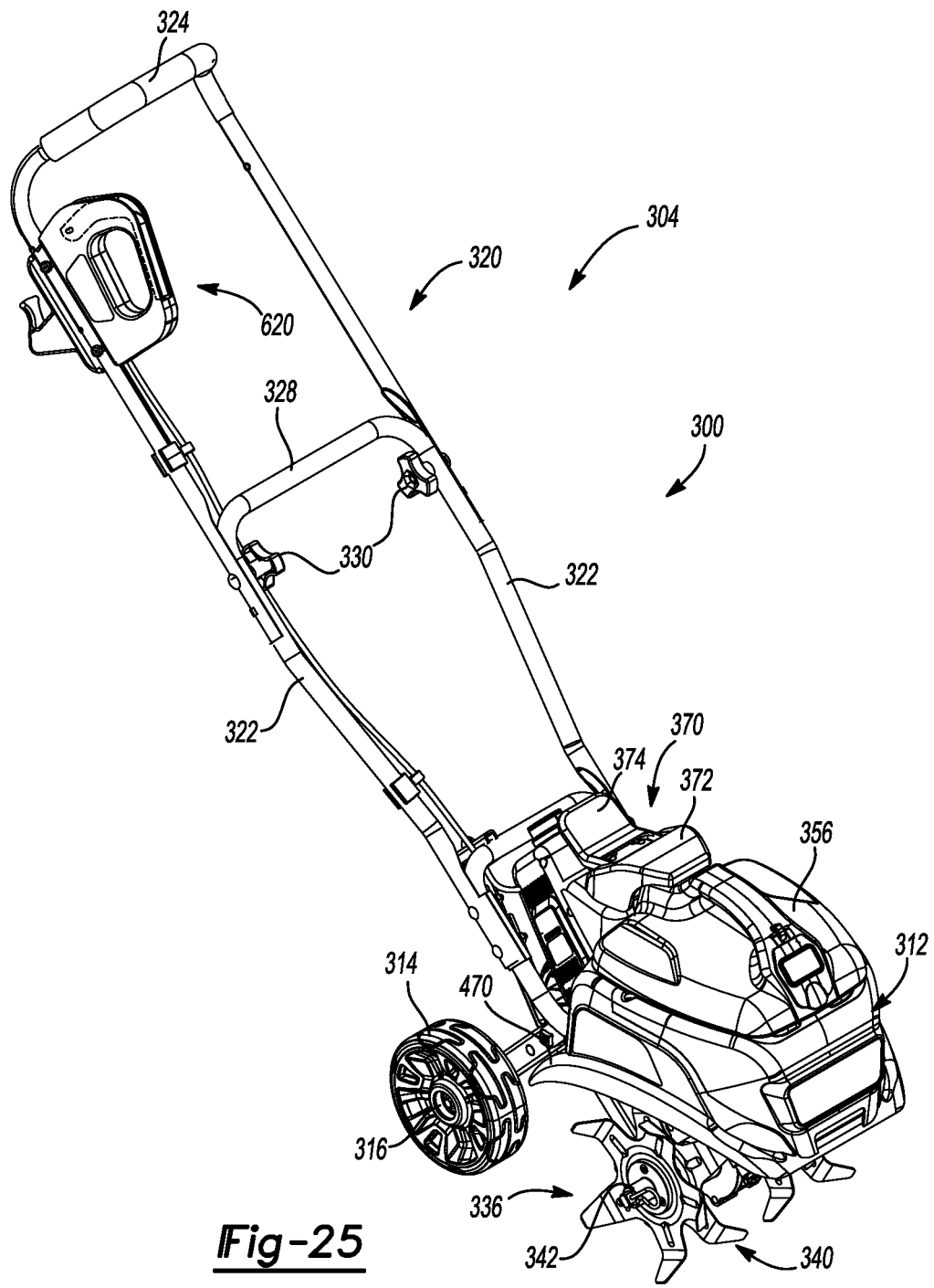
FIG. 25 is a front perspective view of the tiller of FIG. 24 and shown with a ballast received into the cavity in the second electric-powered configuration.
Figure 26:
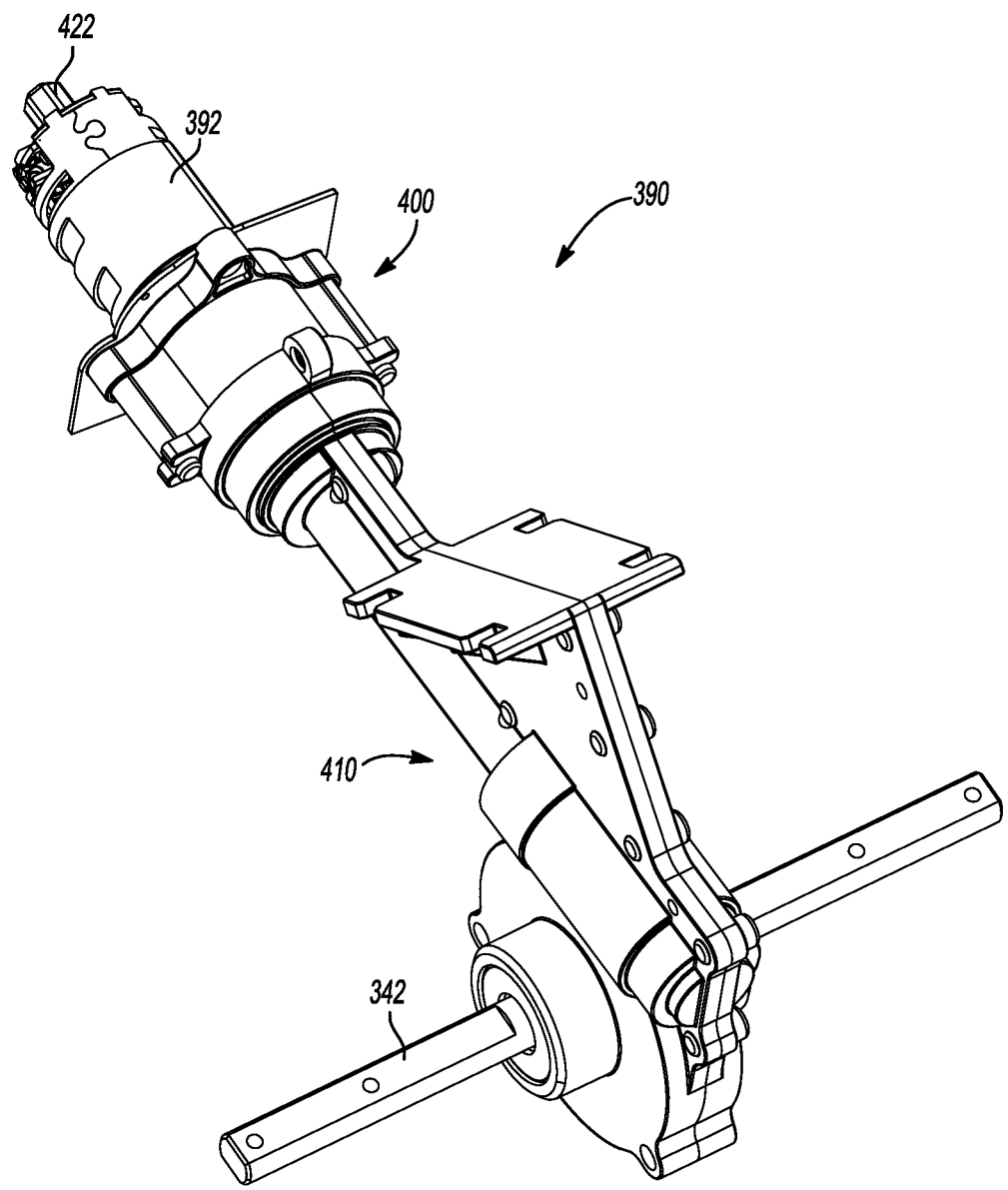
FIG. 26 is a front perspective view of a transmission assembly including a battery-powered motor configured for use with the battery-powered configuration of FIG. 24.
Figure 27:
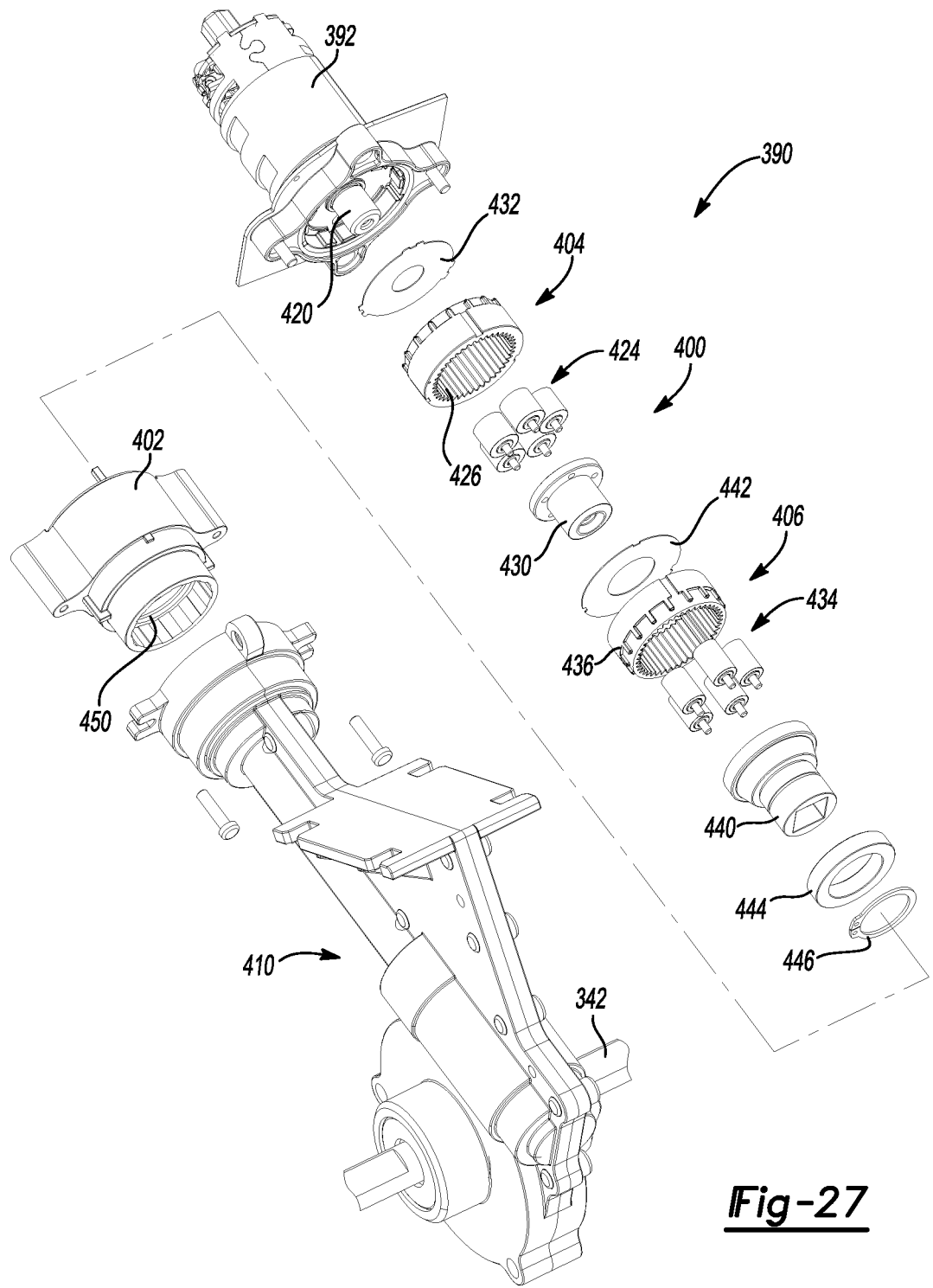
FIG. 27 is an exploded perspective view of the transmission assembly of FIG. 26.
Figure 28:
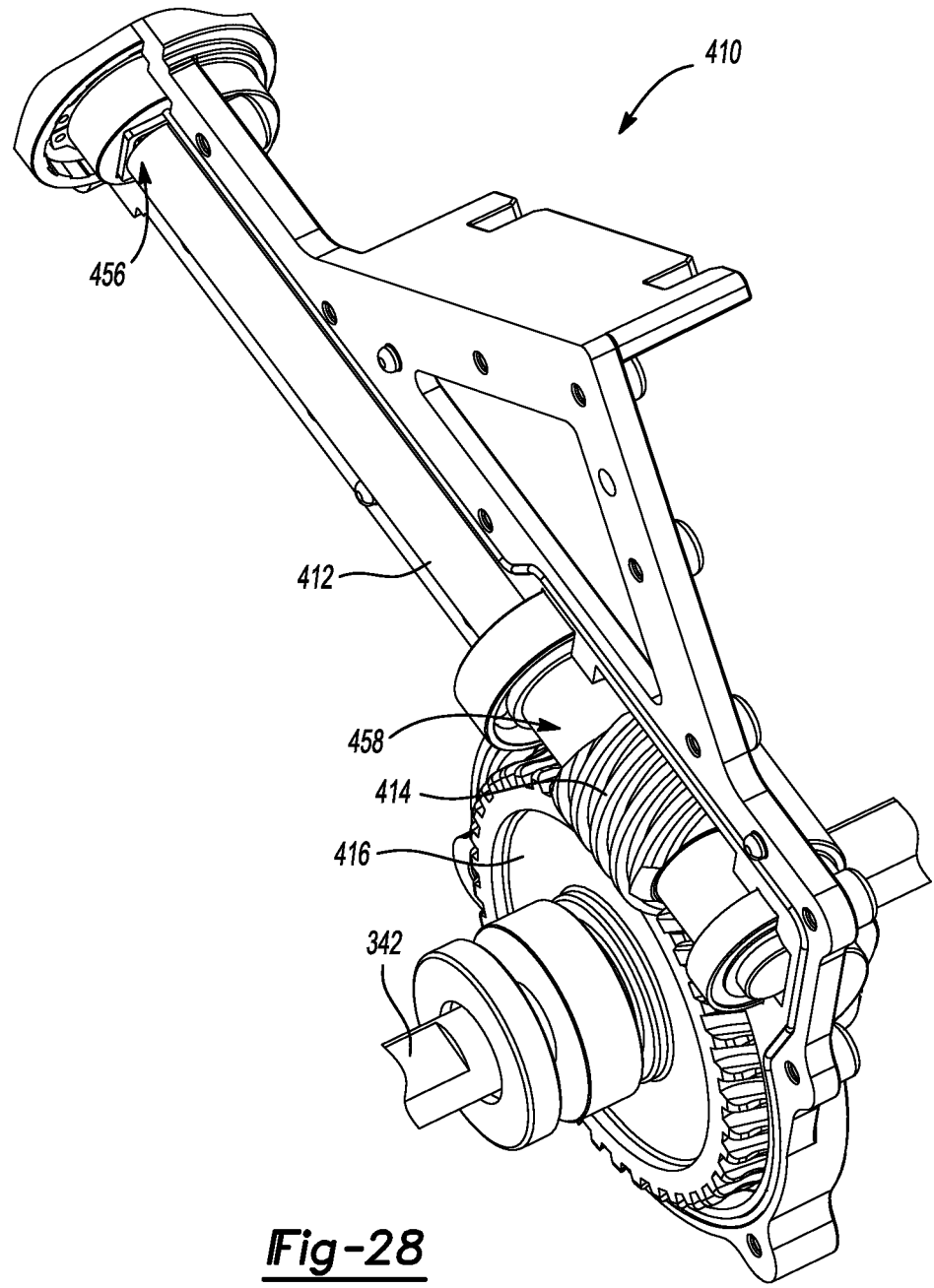
FIG. 28 is a front perspective view of a worm gear assembly provided in the transmission assembly of FIG. 27.

With reference now to FIGS. 24 and 25, a tiller 300 configured for use in a first battery-powered configuration (FIG. 24) and alternatively, a second electric-powered configuration (FIG. 25) is shown. The tiller 300 illustrated in FIG. 24 is shown as a battery-powered tiller 302 while the tiller 300 shown in FIG. 25 is configured as an electric-powered tiller 304. As used herein, the term "battery-powered" has been used to refer generally to a tiller powered by a direct current (DC) portable battery source. The term "electric-powered" has been used to refer generally to a tiller powered by an alternating current (AC) power source. As will become appreciated from the following discussion, the tiller 300 shares many common components between the battery-powered tiller 302 and the electric-powered tiller 304 such that the tiller 300 can be easily converted for configuration as a battery-powered tiller 302 or an electric-powered tiller 304. In this regard, initial description of the tiller 300 will focus on components that are shared between both of the battery-powered tiller 302 and the electric-powered tiller 304.

The tiller 300 generally comprises a frame 312 supported by a pair of wheels 314 that are connected by way of an axle 316. The tiller 300 further comprises an upright assembly 320 having a pair of longitudinal members or lower uprights 322, a handlebar 324, and a cross member 328. A pair of knobs 330 is selectively secured to the lower uprights 322 for selectively coupling the handlebar 324 to the lower uprights 322. The tiller 300 further includes a tilling implement 336 that generally includes a plurality of tine plates (collectively referred to at reference 340) that are rotatably supported by a drive shaft (axle) 342. The tilling implement 336 can be configured similar to the tilling implement 22 described above. For example, the tilling implement 336 can include four tine plates as discussed above with respect to the tilling implement 22.

The tiller frame 312 generally includes an inner sidewall 350 (FIGS. 36 and 37) that defines a cavity 352. The cavity 352, as will be described herein, is configured to selectively and alternatively receive a battery 354 (FIG. 24) or a ballast 356 (FIG. 25). The inner sidewall 350 includes a plurality of grooves 358 that extend generally laterally into the frame 312. As will be described herein, the grooves 358 are configured to slidably receive complementary structure provided on the battery 354 and the ballast 356. The cavity 352 is generally located above the tilling implement 336. The location of the cavity 352 is particularly advantageous as the weight provided by either the battery 354 or the ballast 356 can be directed downward onto the tilling implement 336 to further encourage the tilling implement 336 to negotiate into the ground.

Figure 31:
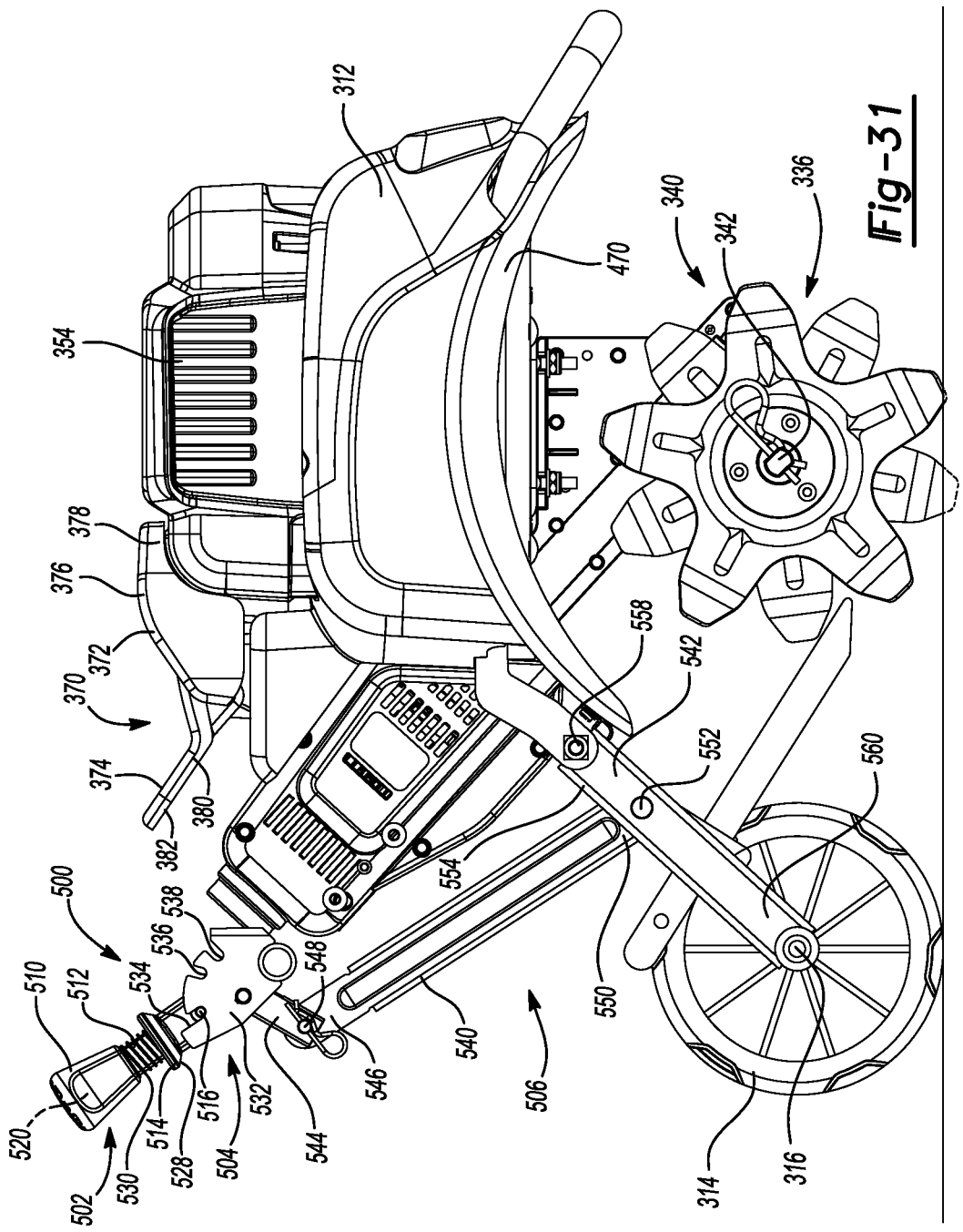
FIG. 31 is a side view of the tiller shown in FIG. 24 shown with the upright assembly removed (for illustration purposes) and with the height adjustment assembly in a first position.

Referring now to FIGS. 24, 25, and 31, the tiller 300 further includes a latch assembly 370. The latch assembly 370 generally comprises a latch 372 and a swing arm 374. The latch 372 generally includes a first body 376 having a catch 378 (see FIG. 31). The swing arm 374 generally includes a second body 380 having a user engagement end 382. In use, the latch assembly 370 is configured to secure the battery 354 into the cavity 352 or alternatively, secure the ballast 356 into the cavity 352. In general, the catch 378 can extend at a position to engage an upper surface of either the battery 354 or the ballast 356. In one example, the latch assembly 370 can be an over-center latch such that the first body 376 of the latch 372 and the second body 380 of the swing arm 374 are pivotally coupled. In this regard, a user can urge the user engagement portion 382 of the swing arm 374 in a direction generally clockwise as viewed from FIG. 33 causing the latch 372 to move generally counter-clockwise and away from either the battery 354 or the ballast 356. Similarly, a user can rotate the user engagement portion 382 of the swing arm 374 in a direction generally counter-clockwise as viewed from FIG. 33 to urge the catch 378 in a clockwise direction into engagement with either the battery 354 or the ballast 356. Other configurations are contemplated. In some examples, the latch assembly 370 may not be incorporated, such as on the electric-powered tiller 304.

Figure 29:
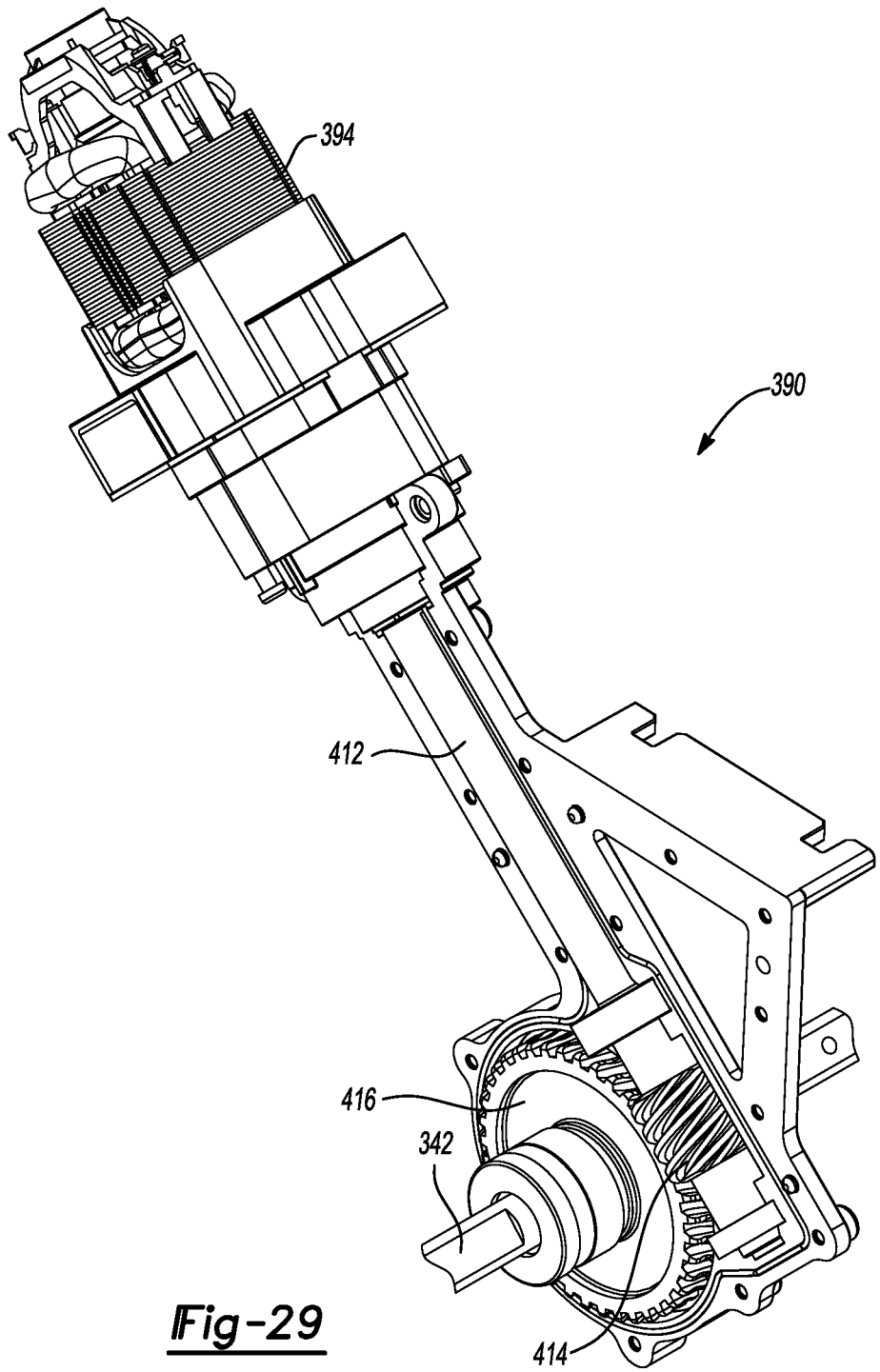
FIG. 29 is a front perspective view of the transmission assembly of FIG. 26 configured for use with an electric motor in the electric-powered configuration.
Figure 30:
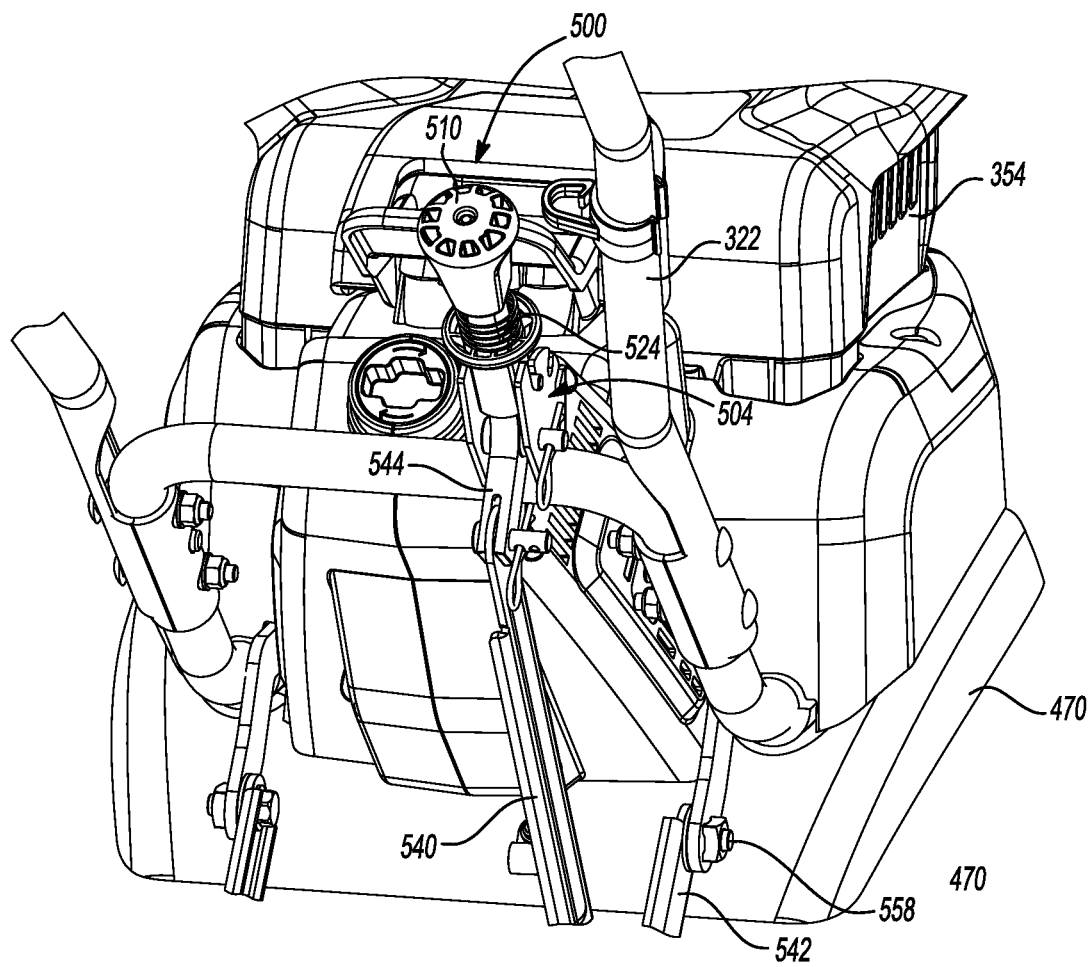
FIG. 30 is a rear perspective view of the tiller of FIG. 24 illustrating a height adjustment assembly constructed in accordance to one example of the present teachings.

With reference now to FIGS. 26-29, additional features of the tiller 300 will be described. The tiller 300 generally includes a transmission assembly 390 that is supported by the frame 312 (FIG. 24). The transmission assembly 390 can be configured for use in a first battery-powered configuration (FIG. 26) or a second electric-powered configuration (FIG. 29). In the battery-powered configuration, the transmission assembly 390 is operably coupled with a first power source including a battery-powered motor 392. Alternatively, the transmission assembly 390 shown in FIG. 29 can be operably coupled with an electric motor 394. In the example provided, the battery-powered motor 392 can include a 36 Volt DC motor. The electric-powered motor 394 can include a 120V AC motor. Other configurations are contemplated.

The transmission assembly 390 will now be further described. The transmission assembly 390 generally includes a planetary gear assembly 400 arranged in a planetary gearbox housing 402. The planetary gear assembly 400 generally includes a primary planetary gear assembly 404 and a secondary planetary gear assembly 406. The planetary gear assembly 400 therefore provides a dual gear reduction within a single planetary gearbox housing 402. The planetary gear assembly 400 is operably coupled to a worm gear transmission 410 that generally comprises a worm shaft 412 (FIG. 28), worm 414, and worm gear 416.

The motor 392 includes a motor output shaft 420 that provides a rotatable input to the primary planetary gear assembly 404. A gripping detail 422 can extend at an opposite end of the motor 392. The gripping detail 422 can cooperate with an unjamming mechanism such as described above with respect to the unjamming mechanism 200. The primary planetary gear assembly 404 generally includes a plurality of first planet gears 424 (FIG. 27) that are meshingly engaged for rotation around a first ring gear 426. For clarity, the first plurality of planet gears 424 is shown without radial teeth. However, it is appreciated that the first plurality of planet gears 424 include teeth formed on outer diameters that meshingly engage complementary teeth formed on the first ring gear 426. In the particular exemplary configuration shown, the motor output shaft 420 functions as a sun gear and the first plurality of planet gears 424 operably rotationally drive a first planetary output shaft 430. In this regard, the primary planetary gear assembly 404 can provide a first gear reduction between the motor output shaft 420 and the first planetary output shaft 430. A first plate 432 can be arranged intermediate the motor 392 and the first ring gear 426.

The secondary planetary gear assembly 406 can generally include a second plurality of planet gears 434 that are mounted for rotation around a second ring gear 436. Again, while the second plurality of planet gears 434 are illustrated without teeth formed around their respective outer diameters, for clarity, the second plurality of planetary gears 434 have complementary teeth for meshing engagement with the teeth formed on the second ring gear 436. The first output shaft 430 of the first planetary gear assembly 400 serves as an input sun gear for the secondary planetary gear assembly 406. The second plurality of planet gears 434 is coupled to rotatably drive a second output shaft 440. In this regard, the secondary planetary gear assembly 406 provides a secondary gear reduction from the first output shaft 430 of the first planetary gear assembly 404 to the second output shaft 440 of the second planetary gear assembly 406. The planetary gear assembly 400 provides a two-stage reduction of 11.6:1. Other configurations are contemplated.

A second plate 442 can be arranged generally intermediate the first output shaft 430 and the second ring gear 436. A bearing 444 and snap ring 446 can generally be arranged adjacent to the second output shaft 440. The snap ring 446 can cooperate with a groove defined around the second output shaft 440 for capturing the bearing 444 and the planetary gear assembly 400 within the planetary gearbox housing 402.

The worm shaft 412 of the worm gear transmission 410 has a first end 456 (FIG. 28) that is fixed for rotation with the second output shaft 440 of the planetary gear assembly 400 and a second end 458 that includes the worm 414. Rotation of the worm 414 results in rotation of the worm gear 416 and ultimately in rotation of the drive shaft 342 of the tilling implement 336. The worm gear transmission 410 provides a 10:1 gear reduction. Other configurations are contemplated.

As can be appreciated, the planetary gear assembly 400 and worm gear transmission 410 can be operably coupled for use with either of the motor 392 in the battery-powered configuration (FIG. 24) or the motor 394 in the electric-powered configuration (FIG. 25). The tiller frame 312 can additionally include a fender 470 that can function as a mud guard. In some examples, the fender 470 can be integrally formed or unitary with the tiller frame 312.

Returning now to FIG. 24, additional features of the tiller 300 configured as a battery-powered tiller 302 will be described. In general, the battery-powered tiller 302 includes a power control assembly 488 that generally includes a power box 490 and an engagement lever 492. The power box 490 can include a power button 494. In general, the power control assembly 488 can initiate rotatable motion of the tilling implement 336. It is appreciated that while the power control assembly 488 has been shown as a particular orientation and configuration, other configurations may be implemented. In this regard, the power control assembly 488 can be provided to initiate a voltage supply from the battery 354 to the motor 392 causing ultimate rotation of the tilling implement 336.

With reference now to FIGS. 24 and 30-34, the battery-powered tiller 302 comprises a height adjustment assembly 500. The height adjustment assembly 500 provides a simple and robust configuration that permits a user to alter the height of the wheels 314 relative to the frame 312. In this regard, the height adjustment assembly 500 provides the user with a simple one-handed user engagement to easily configure the relative height of the wheels 314 according to a particular task.

Figure 32:
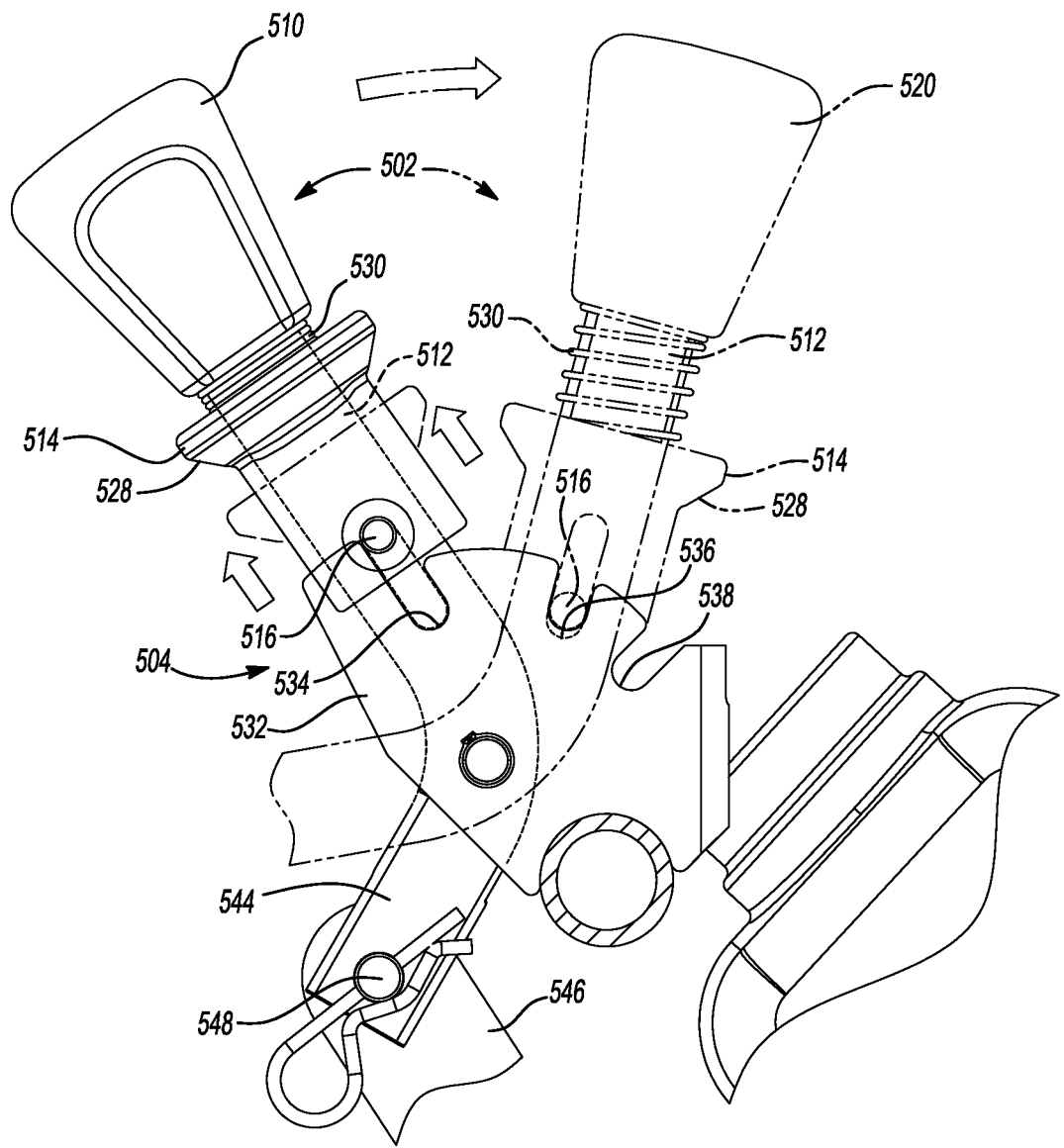
FIG. 32 is a perspective view of the height adjustment assembly shown with a collar translating relative to a shaft resulting in a protrusion of the height adjustment assembly being selectively located into complementary grooves formed on a rack of the height adjustment assembly.

The height adjustment assembly 500 generally includes an arm assembly 502, a rack assembly 504, and a link assembly 506. The arm assembly 502 generally includes a knob 510, a shaft 512, a collar 514, and a protrusion 516. The knob 510 is generally disposed on a terminal end 520 of the shaft 512. The collar 514 generally includes an opening 524 (FIG. 30) that receives the shaft 512. The collar 514 generally includes a rounded sidewall 528. The rounded sidewall 528 is generally configured on an end opposite the knob 510. The protrusion 516 can generally be in the form of oppositely extending pins. In the particular example shown, the collar 514 is configured to slidably translate along the shaft 512 causing the protrusion 516 to also translate therewith (FIG. 32). In one example, the collar 514 can be biased toward the rack assembly 504 by a biasing member 530.

The rack assembly 504 generally comprises a pair of opposing racks 532 collectively defining a first groove 534, a second groove 536, and a third groove 538. The respective first, second, and third grooves 534, 536, and 538 are configured to selectively and alternatively receive the protrusion 516 of the arm assembly 502 when changing the height arm assembly 502 when changing the height of the link assembly 506.

Figure 33:
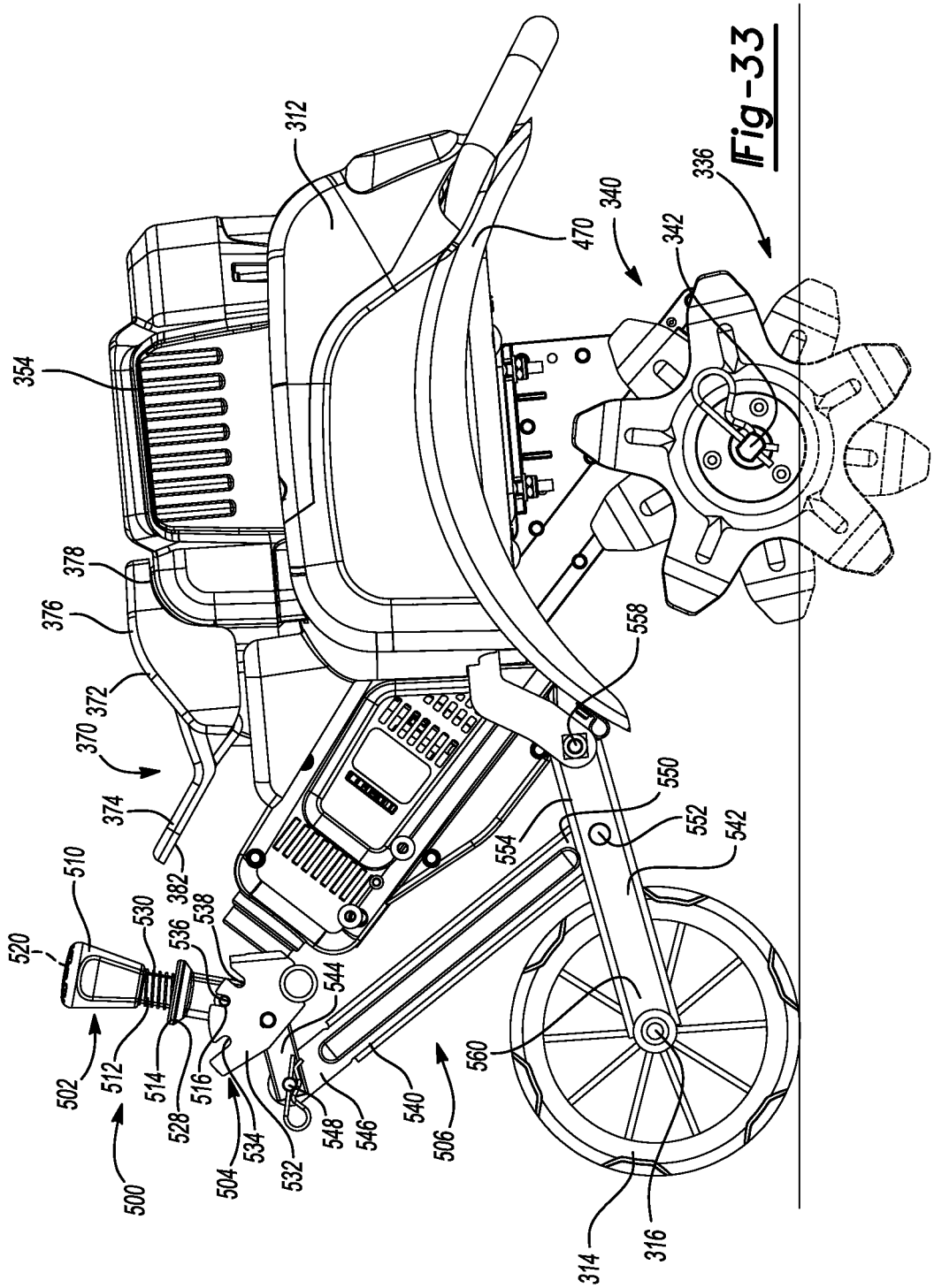
FIG. 33 is a side view of the tiller of FIG. 31 and shown with the protrusion of the height adjustment assembly located in a second groove of the rack of the height adjustment assembly.
Figure 34:
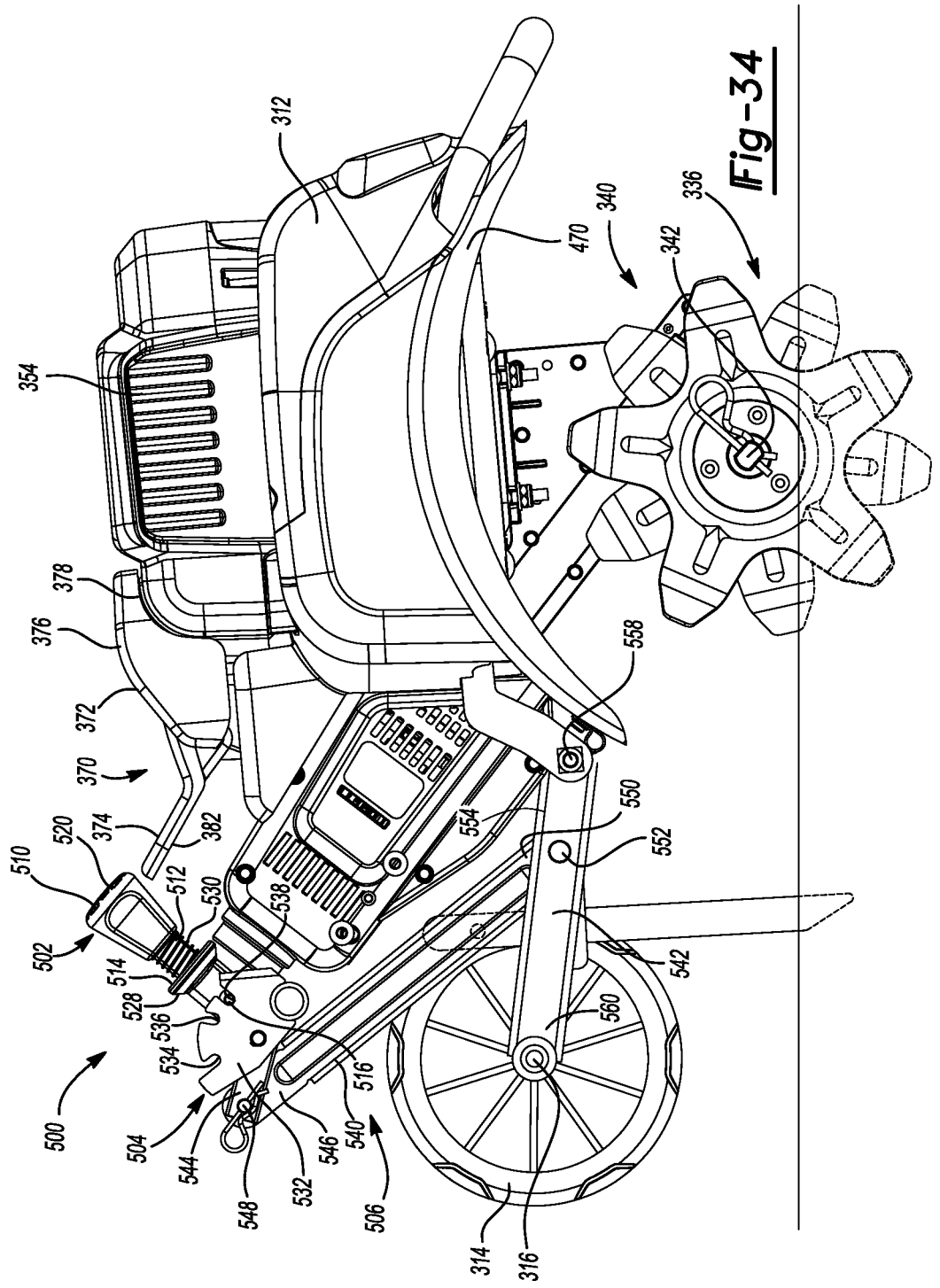
FIG. 34 is a side view of the tiller of FIG. 33 and shown with the protrusion of the height adjustment assembly located into a third groove of the rack of the height adjustment assembly.

The link assembly 506 generally comprises a first link 540, a second link 542, and a third link 544. The first link 540 has a first end 546 that is pivotally coupled at a pivot 548 to the third link 544. The first link 540 also includes a second end 550 that is pivotally coupled to the second link 542 at a pivot 552. The second link 542 has a first end 554 that is coupled to the frame 312 at a pivot 558. The second link 542 also includes a second end 560 that is coupled to the wheels 314 at a pivot (axle 316). During use of the height adjustment assembly 500 (FIG. 32), a user can generally place their palm onto the knob 510 and grasp the rounded sidewall 528 of the collar 514 (such as by a middle finger and ring finger) and pull the collar 514 in a direction generally toward the knob 510. Such action will result in the protrusion 516 to be urged out of one of the first, second, or third grooves 534, 536, and 538. The user can then rotate the shaft between the opposing racks 532 to a position where the protrusion 516 can locate into a different one of the first, second, or third grooves 534, 536, or 538. Once the protrusion 516 has been aligned with a desired groove, a user can let go of the collar 514 causing the protrusion 516 to advance into the desired groove 534, 536, or 538 (such as by way of urging by the spring 530). The result in elevations of the wheels 314 between respective first, second, and third grooves 534, 536, and 538 are shown in FIGS. 31, 33, and 34, respectively.

Figure 35:
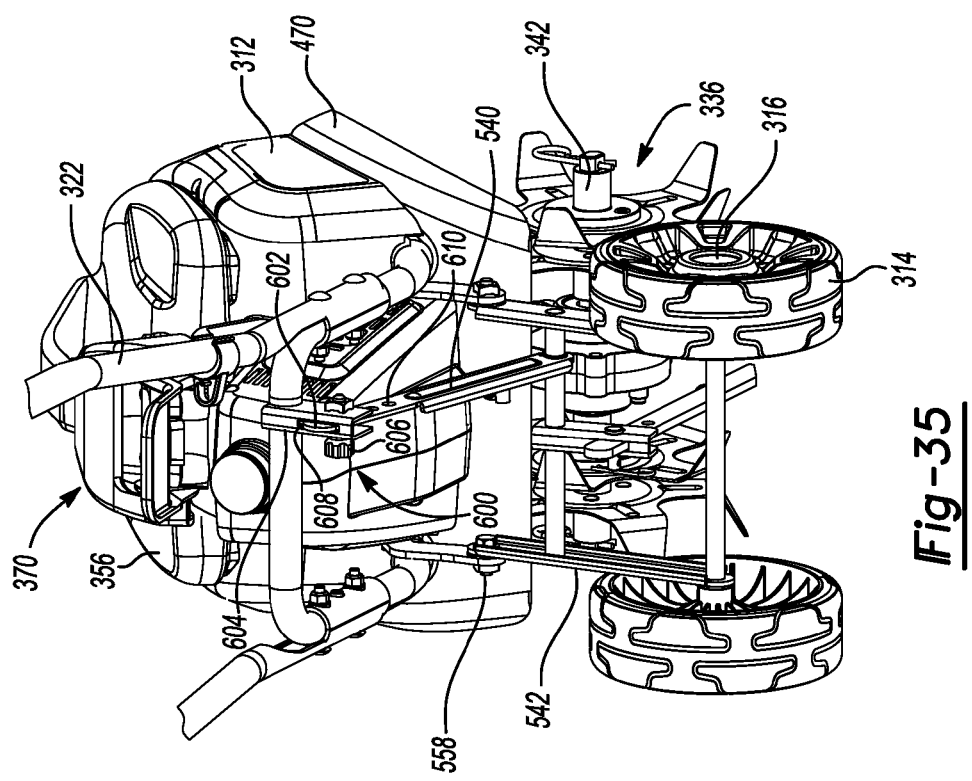
FIG. 35 is a side perspective view of a height adjustment feature of the electric-powered tiller of FIG. 25.

Turning now to FIG. 35, an adjustment feature 600 configured for use with the electric-powered tiller 304 is shown. The adjustment feature 600 generally includes a slide bar 602, bracket 604, and locking pin 606. The bracket 604 can generally include a slot 608 that slidably receives the bar 602. The bar 602 can generally define a plurality of apertures 610 that can be selectively and alternatively movably positioned within the slot 608 such that the lock pin 606 can be located into a desired hole 610 for orienting the wheels 314 at a desired height relative to the frame 312. The electric-powered tiller 304 includes a power control unit 620 that can be used to electrically couple with an AC power source such as an extension cord.

Figure 36:
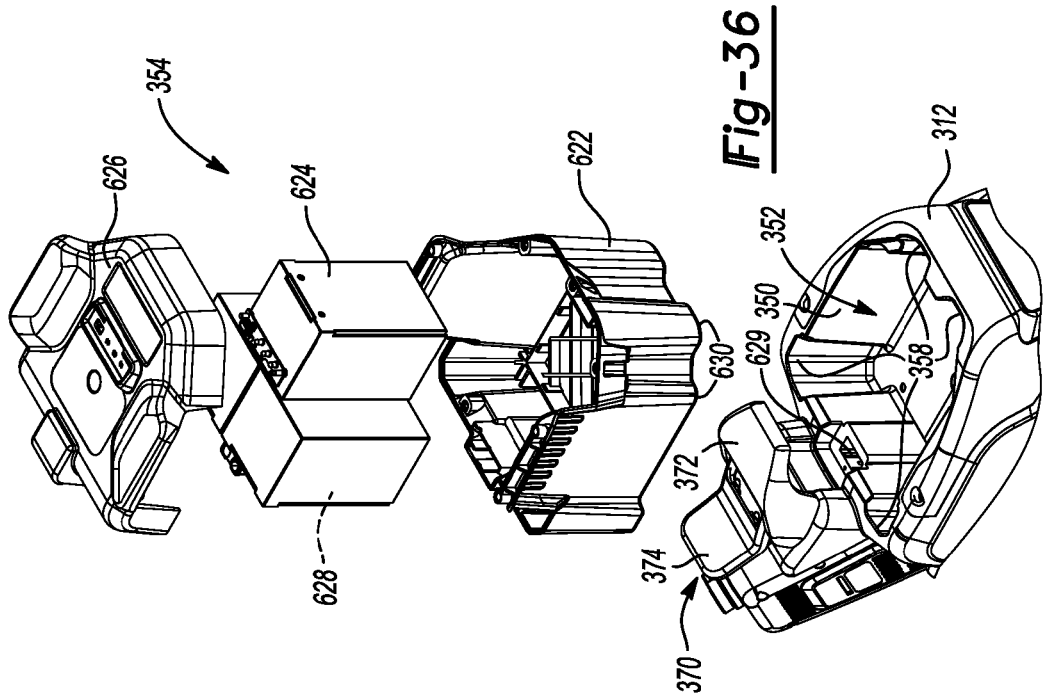
FIG. 36 is an exploded perspective view of the battery-powered tiller of FIG. 24 illustrating the battery removed from the cavity of the frame.
Figure 37:
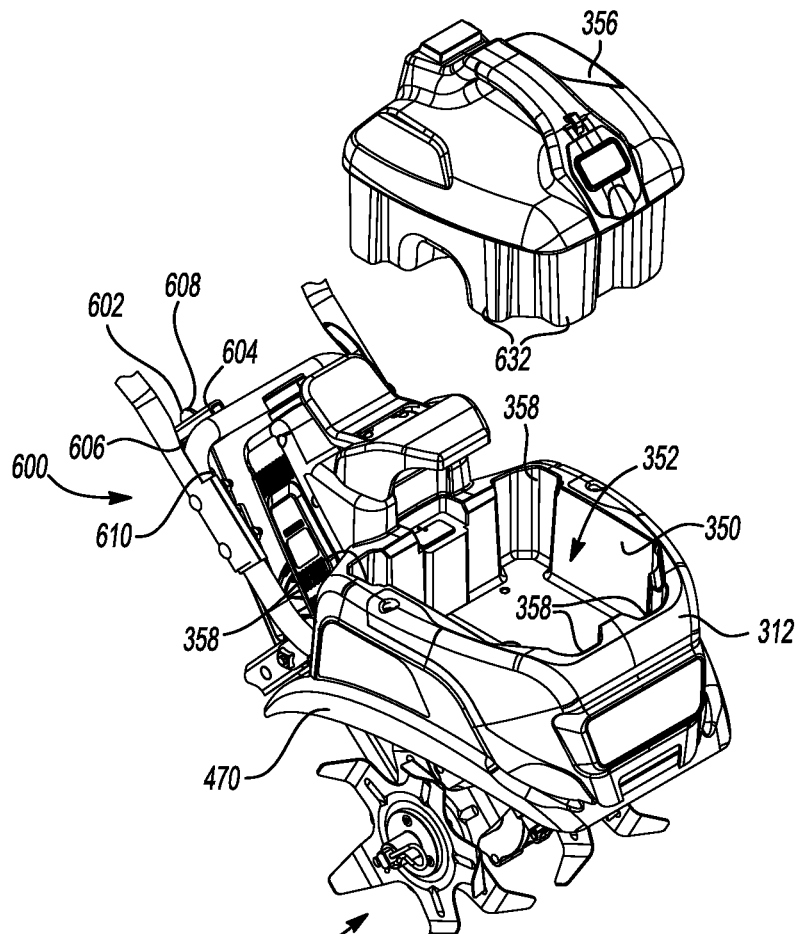
FIG. 37 is an exploded perspective view of the electric-powered tiller of FIG. 25 and shown with the ballast removed from the cavity.

With reference now to FIGS. 36 and 37, the mating geometries of the common footprints of the battery 354 and ballast 356 will be described. While the battery 354 has been generally identified at reference 354, the battery may comprise multiple components such as a holder 622, battery cells 624 and a cover 626. The battery 354 generally includes lateral protrusions 630 (formed on the holder). Similarly, the ballast 356 includes lateral protrusions 632. The respective lateral protrusions 630 of the battery 354 and the lateral protrusions 632 of the ballast 356 are configured to selectively and alternatively be received into the grooves 358 defined on the inner sidewall 350 of the cavity 352. When the battery 354 is inserted into the cavity 352, an electrical connection is made between a first battery connector 628 on the battery 354 and a second battery connector 629 on the frame 312.

Figure 38:
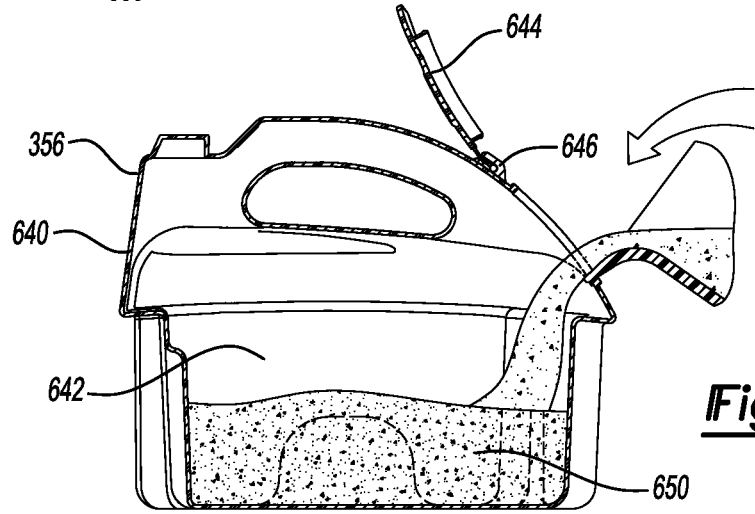
FIG. 38 is a cross-sectional view of the ballast of FIG. 37 illustrating a door of the ballast in an open position and sand being filled into a chamber of the ballast according to one example of the present teachings.

As illustrated in FIG. 38, the ballast 356 can generally include a hollow body 640 that defines a fillable chamber 642. The hollow body 640 can be a blow molded structure. The body 640 includes a door 644 that is rotatably coupled to the body 640 at a hinge 646. The door 644 can be opened to fill the chamber 642 such as with sand 650 or other substance. The ballast 356 can provide additional weight (such as around 10-20 pounds) above the tilling implement 336 to encourage the tines 340 to dig into the ground during use.

While the disclosure has been described in the specification and illustrated in the drawings with reference to various embodiments, it will be understood by those skilled in the art that various changes may be made and equivalents may be substituted for elements thereof without departing from the scope of the disclosure as defined in the claims. Furthermore, the mixing and matching of features, elements and/or functions between various embodiments is expressly contemplated herein so that one of ordinary skill in the art would appreciate from this disclosure that features, elements and/or functions of one embodiment may be incorporated into another embodiment as appropriate, unless described otherwise above. Moreover, many modifications may be made to adapt a particular situation or material to the teachings of the disclosure without departing from the essential scope thereof. Therefore, it is intended that the disclosure not be limited to the particular embodiments illustrated by the drawings and described in the specification as the best mode presently contemplated for carrying out this disclosure, but that the disclosure will include any embodiments falling within the foregoing description and the appended claims.

What is claimed is:

1. An electric-powered tiller comprising:
    a frame assembly that defines a battery compartment;
    an electric motor coupled to the frame assembly;
    a transmission assembly coupled to the frame assembly and driven by the electric motor;
    a plurality of tines driven by the transmission assembly;
    a battery that is configured to be removably received in the battery compartment and electrically coupled to the electric motor to provide a source of electrical power for operating the electric motor; and
    a ballast container that is configured to be removably received in the battery compartment when the battery is not received in the battery compartment, the ballast container being adapted to hold a ballast material;
    wherein the battery compartment is positioned such that the weight of the battery or the ballast container is disposed over the tines when the electric-powered tiller is operated.

2. The electric-powered tiller of claim 1, wherein the ballast container comprises a hollow body and a closure member, the hollow body defining a chamber with an opening through which the ballast material is received into the chamber, the closure member being coupled to the hollow body and configured to close the opening.

3. The electric-powered tiller of claim 2, wherein the closure member is pivotally coupled to the hollow body.

4. The electric-powered tiller of claim 1, wherein the battery comprises a battery housing having a first side wall member of a predetermined shape that is matingly received into the frame assembly.

5. The electric-powered tiller of claim 4, wherein the ballast container has a second side wall member of the predetermined shape.

6. The electric-powered tiller of claim 1, wherein the electric motor is a DC electric motor.

7. The electric-powered tiller of claim 6, further comprising a power control unit that is electrically coupled to the motor and a battery terminal, the battery terminal being configured to be coupled to the battery when the battery is received battery compartment, the power control unit also being configured to be coupled to a source of AC power to provide power to the electric motor when the battery is not received in the battery compartment and coupled to the battery terminal.

8. A method for operating an electric-powered tiller comprising:
    placing a battery in a battery compartment of the electric-powered tiller and electrically coupling the battery to an electric motor that is operable for driving a plurality of tines through a transmission assembly;
    removing the battery from the battery compartment;
    installing a ballast container to the battery compartment;
    coupling the electric motor to a source of AC power; and
    operating the electric motor on AC power with the ballast container received in the battery compartment.

9. The method of claim 8, further comprising filling the ballast container with a ballast material.

10. The method of claim 9, wherein the ballast material comprises sand.

11. The method of claim 9, wherein the ballast container comprises a hollow body and a closure member, the hollow body defining a chamber with an opening through which the ballast material is received into the chamber, the closure member being coupled to the hollow body and configured to close the opening.

12. The method of claim 8, wherein the ballast container is filled with 10 pounds to 20 pounds of a ballast material.

13. An electric-powered tiller comprising:
a frame supported by at least one wheel and defining a cavity;
an upright assembly extending from the frame;
an electric-powered motor;
a transmission assembly that is supported by the frame and that has an input member and an output member, the input member being drivingly coupled to the electric-powered motor;
a tilling implement having a drive shaft that is driven by the output member, the tilling implement comprising at least one tine plate;
a ballast that includes a housing that is removably received in the cavity and configured to provide additional mass to the frame and to urge the at least one tine plate into engagement with a working surface; and
a battery that is configured to be removably received in the cavity when the ballast is not received in the cavity, and to be electrically coupled to the electric-powered motor to provide a source of electrical power for operating the electric-powered motor.

14. The electric-powered tiller of claim 13 wherein the cavity is positioned generally above the tilling implement.

15. The electric-powered tiller of claim 13 wherein the ballast includes a hollow body that defines a fillable chamber.

16. The electric-powered tiller of claim 15 wherein the ballast comprises a door that is movable between an open position permitting access to the chamber and a closed position that closes off access to the chamber.

17. The electric-powered tiller of claim 16 wherein the cavity of the frame defines a first shape and wherein the ballast defines a second shape, wherein the first shape includes one of a groove or a projection and the second shape includes the other of the groove or the projection, wherein the projection is shaped to be slidably received by the groove.

18. The electric-powered tiller of claim 13, further comprising an adjustment feature that moves the at least one wheel relative to the frame, the adjustment feature comprising a bar that is selectively received by a slot in a bracket, the bar having at least two apertures configured to selectively receive a lock pin to orient the at least one wheel at a desired height relative to the frame.

19. The electric-powered tiller of claim 13 wherein the electric-powered motor comprises a 120 volt alternating current motor.

20. The electric-powered tiller of claim 13, further comprising a power control unit disposed on the upright assembly configured to electrically couple the electric-powered motor with an alternating current power source.

21. The electric-powered tiller of claim 13, wherein the cavity is positioned such that the weight of the ballast is disposed over the at least one tine plate when the electric-powered tiller is operated.

* * * * *